(12) United States Patent
Jung

(10) Patent No.: US 7,948,209 B2
(45) Date of Patent: May 24, 2011

(54) WIRELESS CHARGER SYSTEM FOR BATTERY PACK SOLUTION AND CONTROLLING METHOD THEREOF

(75) Inventor: Chun-Kil Jung, Seoul (KR)

(73) Assignee: Hanrim Postech Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/093,520

(22) PCT Filed: Sep. 13, 2007

(86) PCT No.: PCT/KR2007/004418
§ 371 (c)(1),
(2), (4) Date: May 13, 2008

(87) PCT Pub. No.: WO2009/011475
PCT Pub. Date: Jan. 22, 2009

(65) Prior Publication Data
US 2010/0156343 A1    Jun. 24, 2010

(51) Int. Cl.
*H02J 7/00* (2006.01)
*H01F 27/42* (2006.01)
(52) U.S. Cl. ........................ 320/108; 307/104
(58) Field of Classification Search .................. 320/108; 307/104
See application file for complete search history.

(56) References Cited

U.S. PATENT DOCUMENTS

| | | | | |
|---|---|---|---|---|
| 5,734,254 A | * | 3/1998 | Stephens | 320/106 |
| 5,959,433 A | * | 9/1999 | Rohde | 320/108 |
| 7,375,493 B2 | * | 5/2008 | Calhoon et al. | 320/108 |
| 7,622,892 B2 | * | 11/2009 | Kim et al. | 320/108 |
| 2003/0048095 A1 | * | 3/2003 | Zink et al. | 320/108 |

FOREIGN PATENT DOCUMENTS

| | | |
|---|---|---|
| KR | 10-2002-0057468 A | 7/2002 |
| KR | 10-2006-0002325 A | 1/2006 |
| KR | 10-2006-0106632 A | 10/2006 |
| KR | 10-2007-0014004 A | 1/2007 |

* cited by examiner

*Primary Examiner* — M'Baye Diao
(74) *Attorney, Agent, or Firm* — Echelon Law Group, PC

(57) ABSTRACT

A wireless charger system for a battery pack is disclosed. The wireless charger system in one exemplary embodiment may include a wireless charger apparatus for receiving an external power source to transmit a power signal via a charging power transmitter block and a battery pack for receiving a power signal from the wireless charger apparatus to charge power in a battery cell and supplying a power source to a portable terminal block. The wireless charger apparatus may also have an outer body composed of a resonant converter for supplying power to the battery pack and a wireless charger case having a central controller installed inside. The wireless charger case may have a protruded round portion formed around the rear edge and a display block provided as the sloped surface in the front portion thereof.

8 Claims, 14 Drawing Sheets

Fig. 17
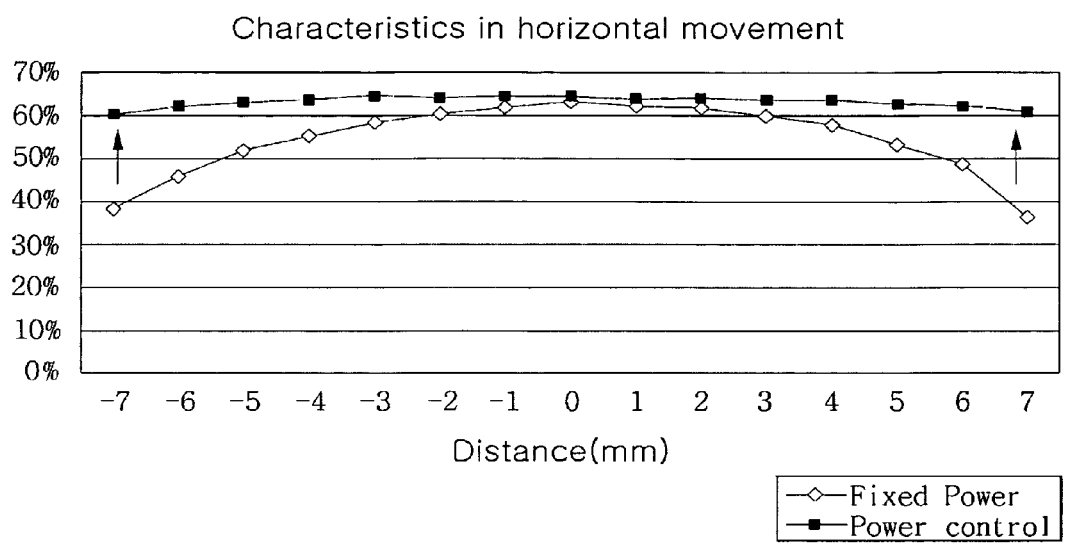
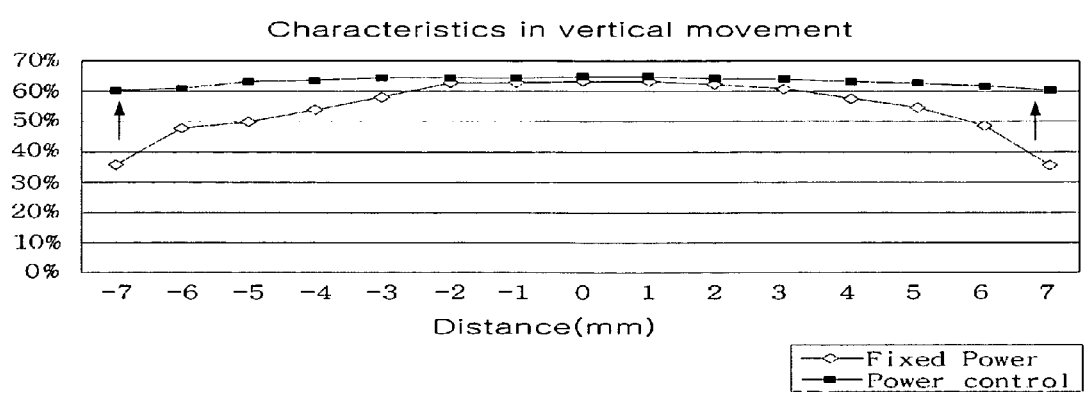
Fig. 18

Fig. 19
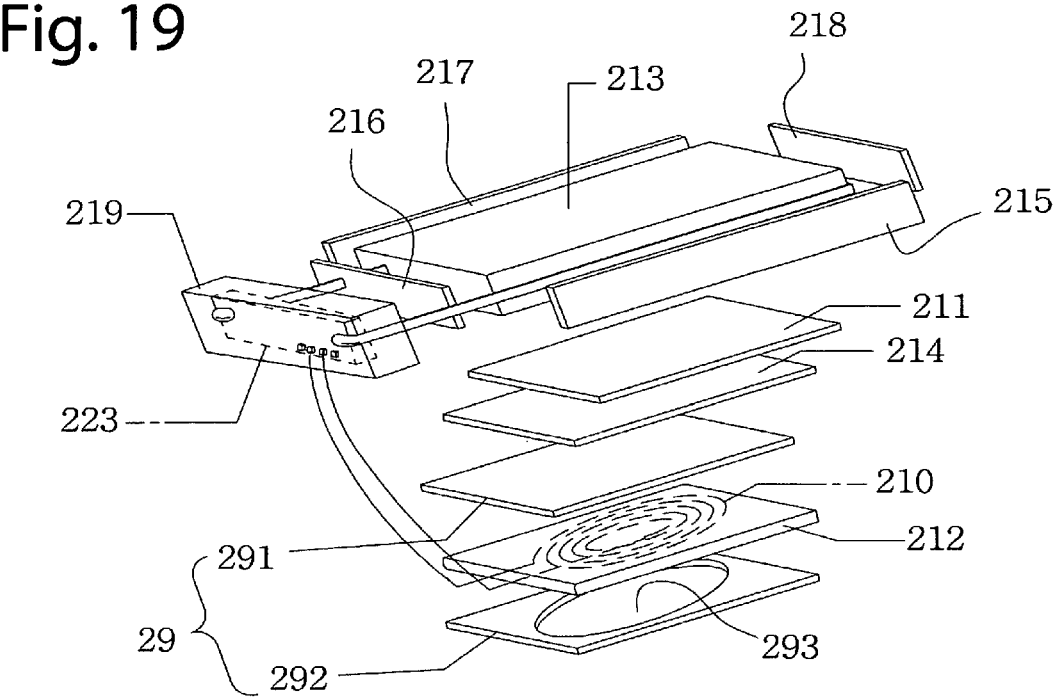
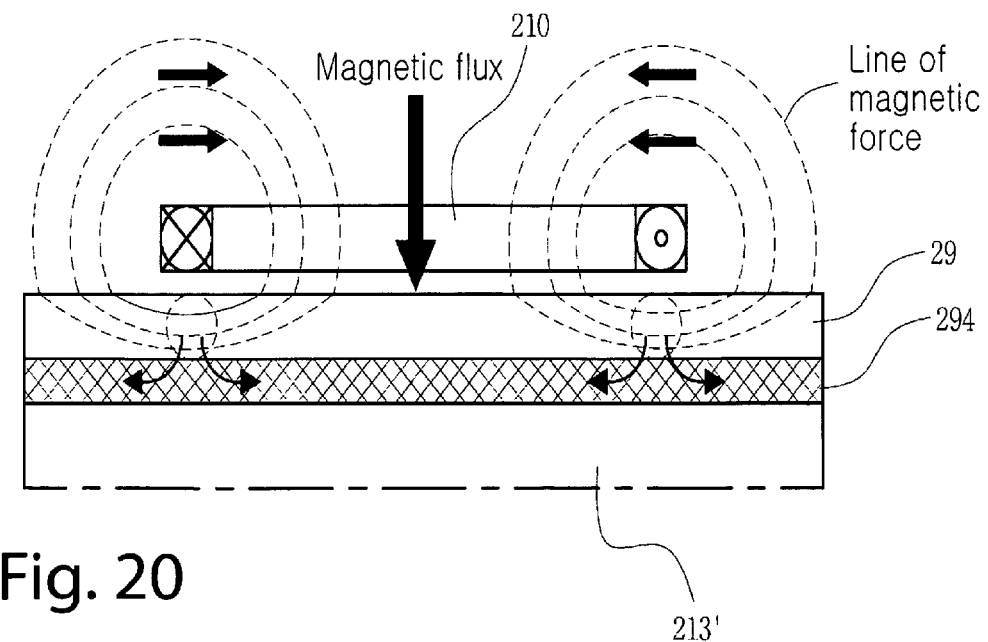
Fig. 20

WIRELESS CHARGER SYSTEM FOR BATTERY PACK SOLUTION AND CONTROLLING METHOD THEREOF

TECHNICAL FIELD

The present invention relates to a wireless charger system, and more particularly to a wireless charger system for a battery pack solution that is provided so that a wireless charger system composed of a wireless charger apparatus and a battery pack can supply a power source to a portable terminal block through the wireless power transmission.

BACKGROUND ART

In general, a battery pack functions to supply a power source of a portable terminal block, and is composed of a battery cell for storing electricity; and a charging circuit for charging and supplying the electricity.

As a charger for charging electricity in a battery pack for this portable terminal block, there is a terminal supply system in which electricity is received from a conventional power source and a power source is supplied to a battery pack via a power supply terminal. However, where the battery pack is attached/detached to/from the charger when a power source is supplied to this terminal supply system, an instant discharge phenomenon occurs due to the different potential difference of terminals disposed in both sides of the battery pack. Therefore, the battery pack has an increasing possibility to start fires as foreign substances are accumulated in the terminals. Also, the life span and performances of the charger and the battery pack may be deteriorated, for example spontaneous discharging in the presence of moisture.

In order to solve these problems regarding the terminal supply system, there has been developed a wireless charger. That is to say, this wireless charger is charged by a secondary coil inside the battery pack when a portable terminal block having a battery pack mounted inside is disposed upwardly in a primary coil of wireless charger. That is to say, electricity induced from an induced electromotive force is charged in the secondary coil by means of the magnetic field generated in the primary coil.

However, these conventional wireless chargers have no practical use since it is possible only to supply a power to a portable terminal block, but they have difficulty in use for other applications.

In particular, the conventional wireless chargers have problems that it is impossible to determine a charging level since they have no additional indicator, and it is also difficult to determine a state of the wireless chargers since a user does not discriminate a respective state in the charging level.

Furthermore, the wireless charger may be damaged due to the increased loss of power in the primary coil when metals are disposed adjacent to the magnetic field generated in the primary coil.

DISCLOSURE

Technical Problem

Accordingly, the present invention is designed to solve such drawbacks of the prior art, and therefore an object of the present invention is to provide a wireless charger system for a battery pack solution that is provided so that a wireless charger system composed of a wireless charger apparatus and a battery pack can supply a power source to a portable terminal block through the wireless power transmission, wherein an input power such as a power for computers and notebook computers using a USB port, an external power used as a power outlet, a mobile power used as a cigar connection port in vehicles is easily supplied to a portable terminal block.

Also, another object of the present invention is to provide a wireless charger system capable of easily checking an operation state of the wireless power charging system from a display index of a display block in the wireless charger apparatus.

Technical Solution

According to an aspect of the present invention, there is provided a wireless charger system for battery pack solution including a wireless charger apparatus 10 for receiving a power source from the outside to transmit a power signal via a charging power transmitter block 15 in a wireless mode; and a battery pack 20 for receiving a power signal from the wireless charger apparatus 10 in a wireless mode to charge power in a battery cell and supplying a power source to a portable terminal block 30, wherein the wireless charger apparatus 10 has an outer body composed of a resonant converter for supplying power to the battery pack and a wireless charger case 101 having a central controller installed inside; the wireless charger case 101 has a protruded round portion 102 formed around the rear edge and a display block 19 provided as a slop surface in the front portion 103 thereof; an a flat surface is formed between the protruded round portion 102 and the front portion 103 and a battery pack positioning block 104 formed therein, the battery pack positioning block 104 having a lower height than the protruded round portion 102 and the front portion 103; and a primary core block 151 for transmitting power supplied to the battery pack 20 is installed inside the battery pack positioning block 104 to supply power to the battery pack 20 disposed on the battery pack positioning block 104.

In this case, the wireless charger apparatus 10 may include a power receiver block 12 for receiving a power source from the outside; a resonant converter 14 for converting an output signal including a power signal and a data signal supplied from the power receiver block 12, and transmitting the converted output signal to a charging power transmitter block 15 provided with a primary core block 151; a gate driver 13 coupled to the power receiver block 12 to transmit an output signal including a data signal and a power signal to the resonant converter 14, the gate driver being controlled by the central controller 11 and provided with a bootstrap gate drive; a current detector block 16 coupled between the power receiver block 12 and the resonant converter 14 to detect a data signal of the battery pack 20 through the transmission operation by means of the primary core block 151; a central controller 11 for controlling the power receiver block 12, the resonant converter 14, the gate driver 13 and the current detector block 16; and a display block 19 for displaying a state of the wireless charger apparatus 10 according to the control signal of the central controller 11.

Here, the battery pack 20 may include a secondary rectification circuit block 22 for converting a power that is induced through a secondary core block 21 by an induced magnetic field generated by a primary core block 151 of the wireless charger apparatus 10; a battery pack controller 24 coupled to the secondary rectification circuit block 22 to supply a charging power to a battery cell 23, to process data transmitted/received by the primary core block 151 and the secondary core block 21 and to transmit data signals for a charging state of the battery pack 20, an erroneous state of the battery pack 20 and a native ID signal value; a battery pack charging circuit block 25 for supplying power to the battery cell 23, the power being supplied from the secondary rectification circuit block 22 under the control of the battery pack controller 24, and supplying a power of the battery cell 23 to the portable terminal block 30; a data input/output block 26 for transmitting/receiving data to/from a portable terminal block 30 under the control of the battery pack controller 24 relative to the data transmitted/received to/from the wireless charger apparatus 10, and processing the data; and a charge monitoring circuit block 27 for checking a charging level of the battery cell 23 and transmitting a fully-charged or discharged signal to the battery pack controller 24.

Also, the secondary core block 21 may have a core formed in a shape selected from the group consisting of a round shape, a rectangular shape, an oval shape and a polygonal shape; the battery pack 20 may be attachable/detachable to/from the portable terminal block 30 and may have an all-in-one hard pack shape in which a power source stored in the battery cell 23 is connected to a terminal block 28; the secondary core block 21 may be formed integrally in the rear of the portable terminal block and may have a built-in shape in which a circuit configuration of the battery pack 20 is configured inside the portable terminal block 30 together, or the battery cell 23 may be formed in the battery pack 20 and may have a battery pack charging circuit block 34 coupled through the terminal block 28, the battery pack charging circuit block 34 being provided inside the portable terminal block 30.

In particular, the display block 19 may include a display signal receiver block 191 for receiving a control signal transmitted from the central controller 11; a light emitting diode (LED) 192, a liquid crystal display (LCD) panel 193 and an icon LCD 194, all of which are coupled to the display signal receiver block 191 to be turned on according to the control signal transmitted from the central controller 11; an LED driver 195 coupled to the display signal receiver block 191 to turn on the LED 192 according to the control signal transmitted from the central controller 11; an LCD panel driver 196 coupled to the display signal receiver block 191 to turn on the LCD panel 193 according to the control signal transmitted from the central controller 11; and an icon LCD driver 197 coupled to the display signal receiver block 191 to turn on the icon LCD 194 according to the control signal transmitted from the central controller 11.

Furthermore, the LED 192 may emit light with a green or red color, the LCD panel 193 may emit light with a blue or green color, the icon LCD 194 may emit light with a blue or green color and be provided to emit the light with a charging level as much as notch marks on a scale according to the signal of the charging level transmitted from the battery pack 20. Also, the LED driver 195 may be driven to turn on the LED 192 with a green or red color under the control of the central controller 11, and the LCD panel driver 196 may be driven to turn on the LCD panel 193 with a blue or green color under the control of the central controller 11. In addition, the icon LCD driver 197 may be provided to turn on the icon LCD 194 with a blue or green color under the control of the central controller 11 and emit the light with a charging level as much as notch marks on a scale according to the control signal depending on the charging level of the battery pack 20.

According to another aspect of the present invention, there is provided a method for controlling a wireless charger system for battery pack solution including a wireless charger apparatus 10 for receiving a power source from the outside to transmit a power signal via a charging power transmitter block 15 in a wireless mode; and a battery pack 20 for receiving a power signal from the wireless charger apparatus 10 in a wireless mode to charge power in a battery cell and supplying a power source to a portable terminal block 30, the method including: waiting for charging of an externally supplied power source by checking a state of the wireless charger apparatus 10 prior to performing a wireless charging through the charging power transmitter block 15 of the wireless charger apparatus 10 (S01); transmitting a call signal for native ID of the battery pack 20 to sense the battery pack 20 through the charging power transmitter block 15 of the wireless charger apparatus 10 (S02); transmitting information on a native ID value and a state of the battery pack via the secondary core block 21 of the battery pack 20 by receiving a call signal of the native ID transmitted from the wireless charger apparatus 10 in the battery pack 20, the native ID value being store in a native ID transmission block 241 of the battery pack 20 (S03); determining the native ID value of the battery pack transmitted from the battery pack 20 and the state of the battery pack 20 (S04); charging a power in the battery pack 20 by transmitting a power via the charging power transmitter block 15 of the wireless charger apparatus 10 and receiving and charging the power in the battery pack 20 when the battery pack 20 is ready to be charged (S05); sensing a completely charged signal in the wireless charger apparatus 10 when the completely charged signal is transmitted from the battery pack 20 in the step of charging the battery pack (S06); and waiting for reception of the information on the charging level and the battery pack state from the battery pack 20 by suspending a charging operation in the central controller 11 of the wireless charger apparatus 10 when the information on the completely charged signal is received from the battery pack 20 (S07).

In this case, the step of waiting for charging of a power source (S01) include: transmitting a signal for a charging-standby state from the central controller 11 to the display block 19 to turn off the LED 192 and the LCD panel 193 (S011); the step of transmitting a call signal of the native ID (S02) may include: transmitting a control signal to the LED driver 195, the LCD panel driver 196 and the icon LCD driver 197 so that the LED 192 and the LCD panel 193 can display a call state of the native ID (S021); the step of charging a battery pack (S05) may include: transmitting a control signal to the LED driver 195, the LCD panel driver 196 and the icon LCD driver 197 so that the LED 192 and the LCD panel 193 can display a charging state (S051), the step of receiving information on the completely charged signal (S06) may include: transmitting a control signal to the LED driver 195, the LCD panel driver 196 and the icon LCD driver 197 so that the LED 192 and the LCD panel 193 can display a completely charged state (S061), and the step of waiting for charging of a power source (S01) may further include: transmitting a control signal to the LED driver 195, the LCD panel driver 196 and the icon LCD driver 197 so that the LED 192 and the LCD panel 193 can display an error state when a signal for foreign substances, which is different from a native ID value of the battery pack, is detected from the charging power transmitter block 15 of the wireless charger apparatus 10.

Advantageous Effects

As described above, the wireless charger system for a battery pack solution, which is composed of a wireless charger apparatus and a battery pack, according to the present invention may be useful to supply a power source to a portable terminal block through the wireless power transmission, wherein input powers such as a power for computers and notebook computers using a USB port, an external power used as a power outlet, a mobile power used as a cigar connection port in vehicles are easily supplied to a portable terminal block.

In particular, the wireless charger system according to the present invention may be useful to easily operate the wireless power charging system and easily check an operation state of the wireless power charging system that is displayed on a display block since the display block is formed in the front portion of the wireless charger apparatus.

DESCRIPTION OF DRAWINGS

FIGS. 13 to 18 are graphs illustrating charging efficiencies according to the extent where a battery pack goes away from the wireless charger system according to the present invention.

FIGS. 19 and 20 are an exploded perspective view and a side cross-sectional view showing a configuration of the battery pack according to the present invention.

BEST MODE

Hereinafter, exemplary embodiments of the present invention will be described in more detail with reference to the accompanying drawings.

Figure 1:
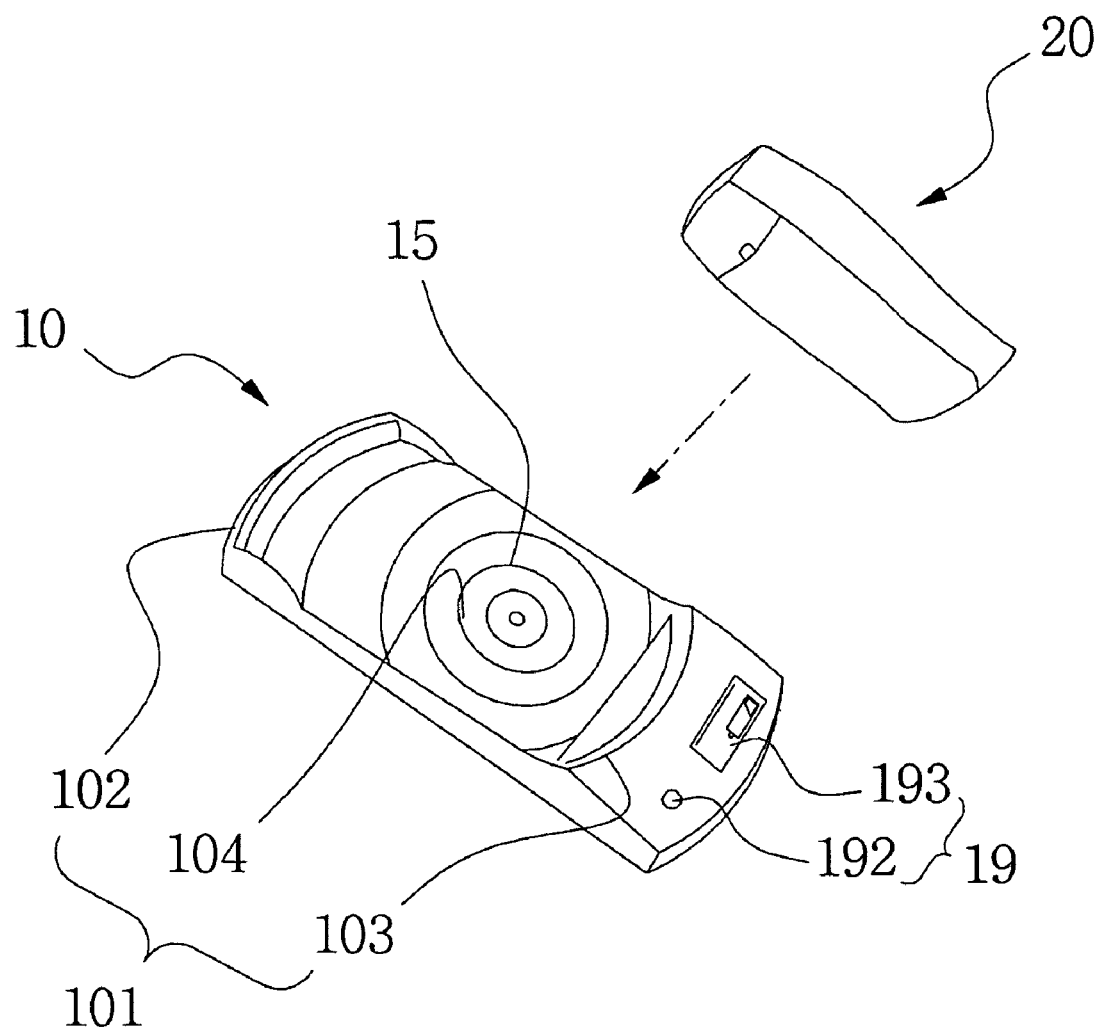
FIG. 1 is an exploded perspective view showing a wireless charger system according to the present invention.
Figure 2:
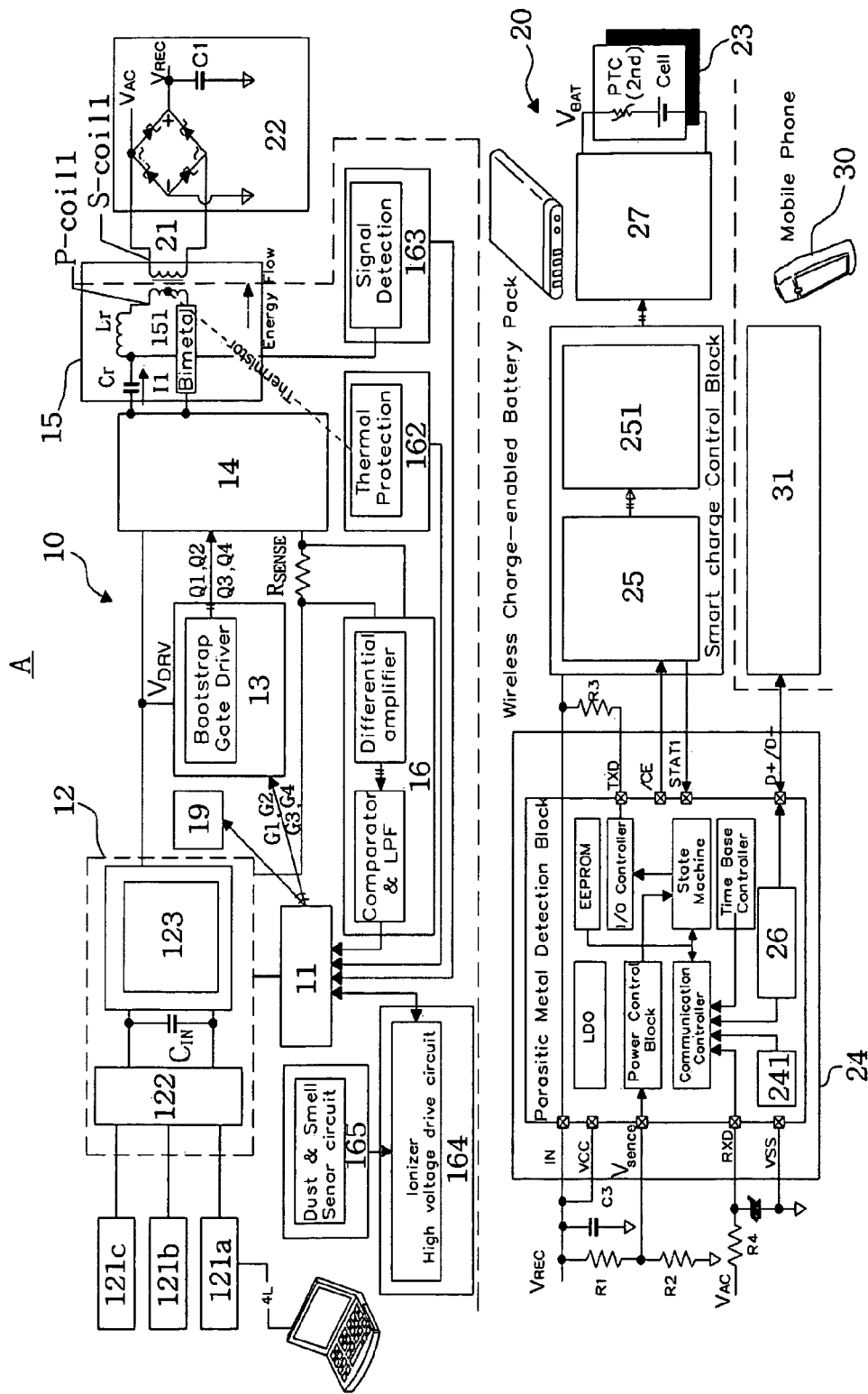
FIG. 2 is a schematic configuration block view showing a wireless charger system according to the present invention.
Figure 6:
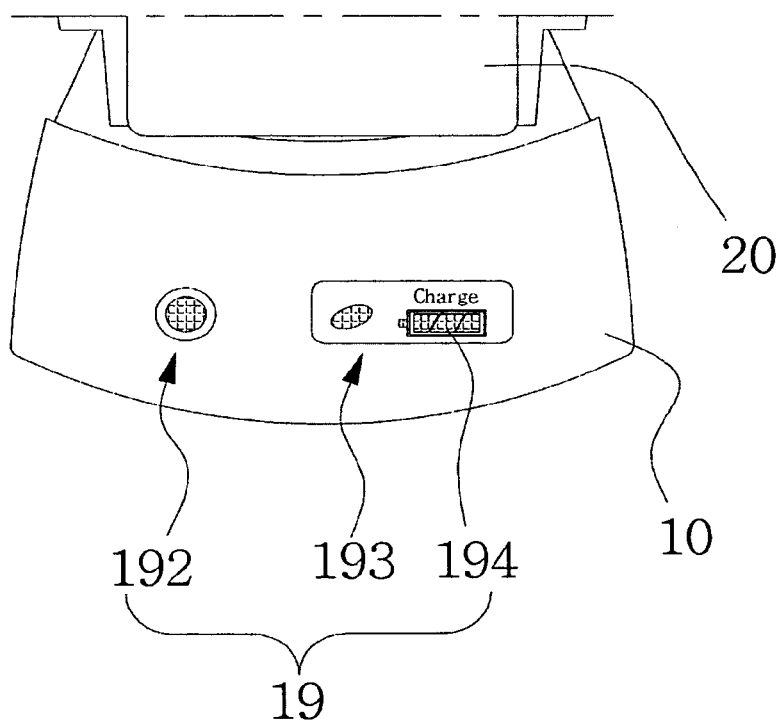
Figure 7:
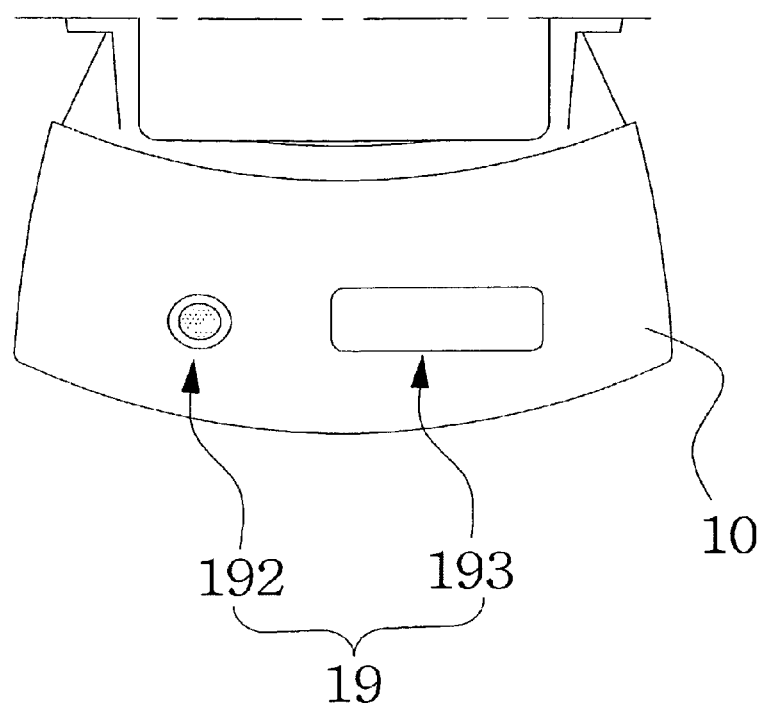
Figure 8:
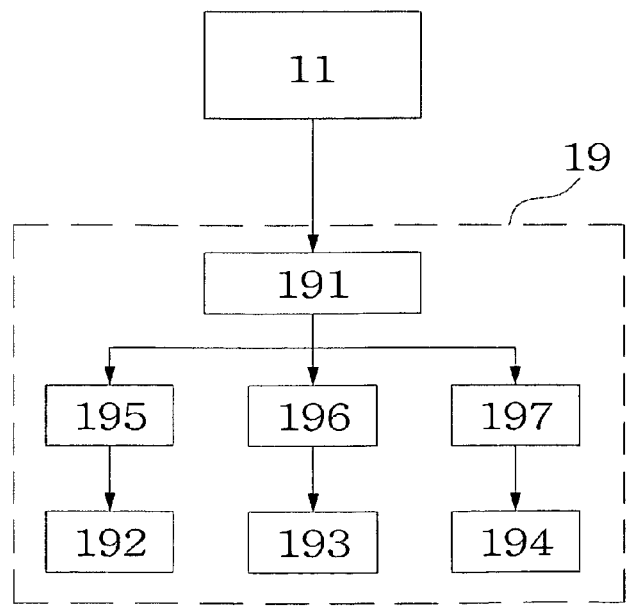
FIG. 8 is a configuration block view showing the display block of the wireless charger system according to the present invention.
Figure 9:
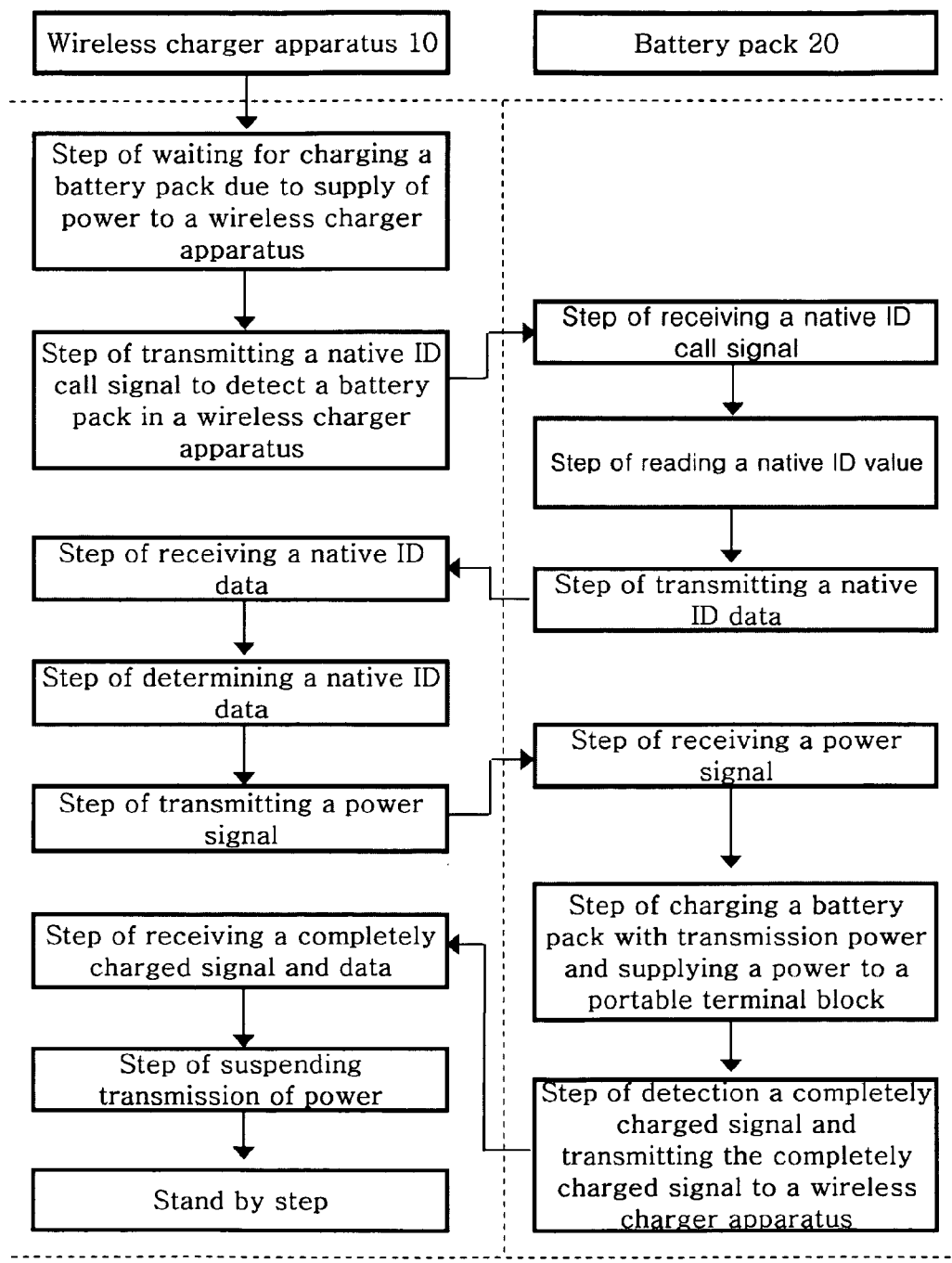
FIGS. 9 and 10 are flowcharts showing a method for controlling a wireless charger system according to the present invention.
Figure 10:
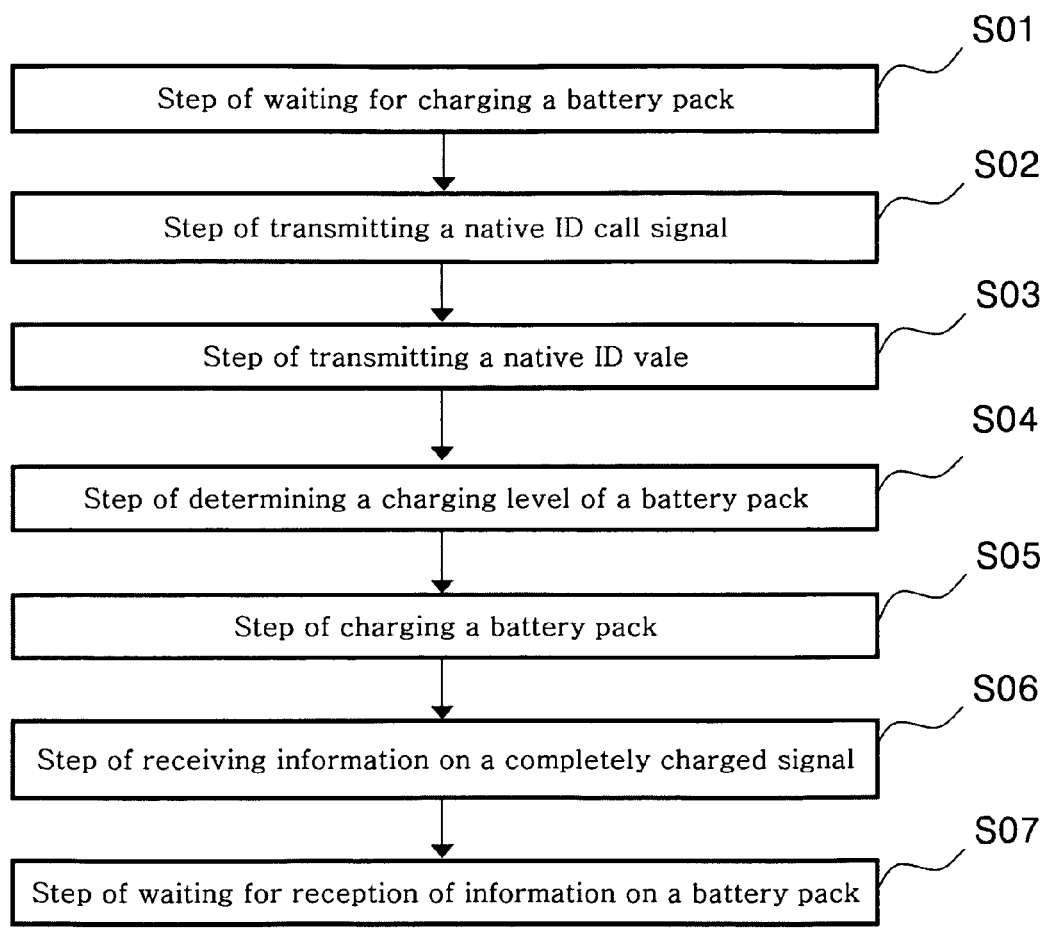
Figure 11:
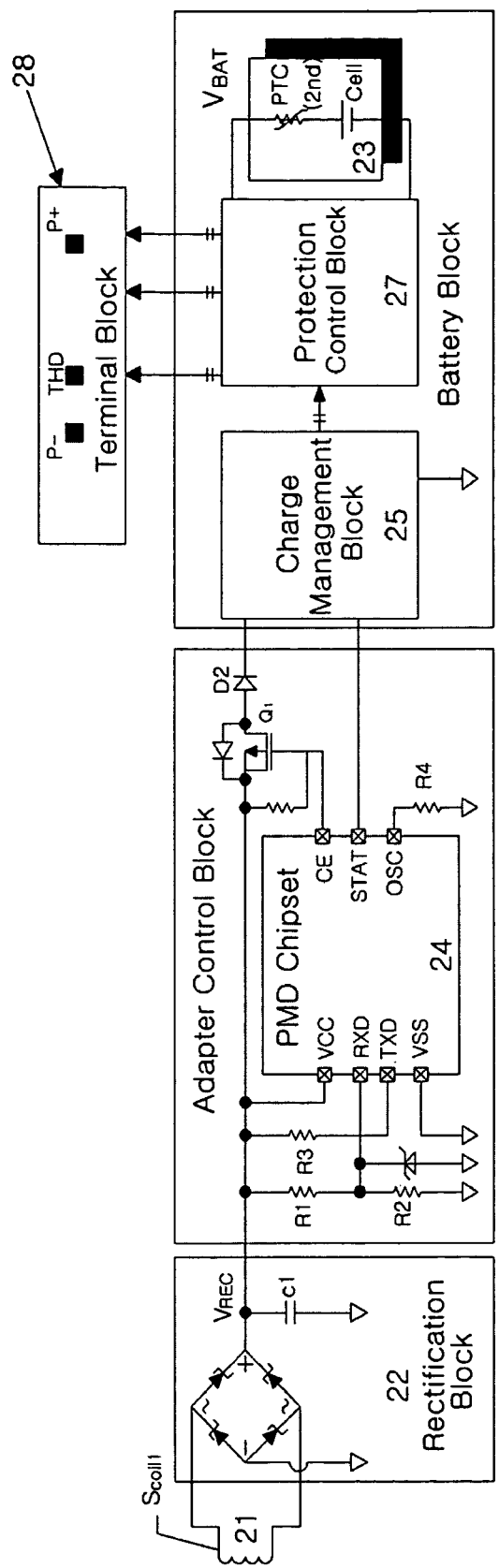
FIGS. 11 and 12 are circuit configuration views showing a battery pack of the wireless charger system according to the present invention.
Figure 12:
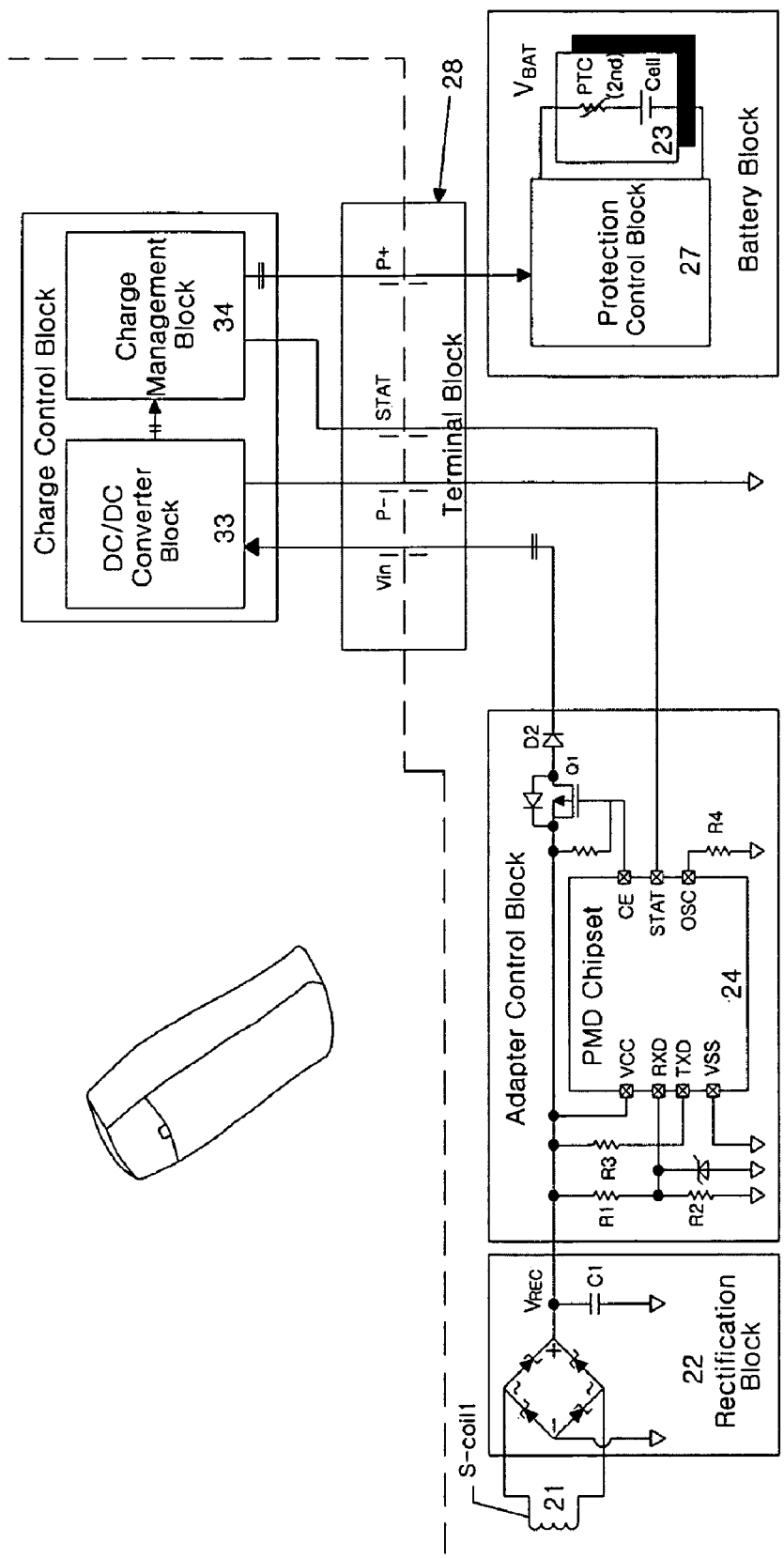

FIG. 1 is an exploded perspective view showing a wireless charger system according to the present invention, FIG. 2 is a schematic configuration block view showing a wireless charger system according to the present invention, and FIGS. 3 to 7 are schematic illustrative views showing a display state on a display block of the wireless charger system according to the present invention. Also, FIG. 8 is a configuration block view showing the display block of the wireless charger system according to the present invention, FIGS. 9 and 10 are flowcharts showing a method for controlling a wireless charger system according to the present invention, respectively. In addition, FIGS. 11 and 12 are circuit configuration views showing a battery pack of the wireless charger system according to the present invention.

Figure 21:
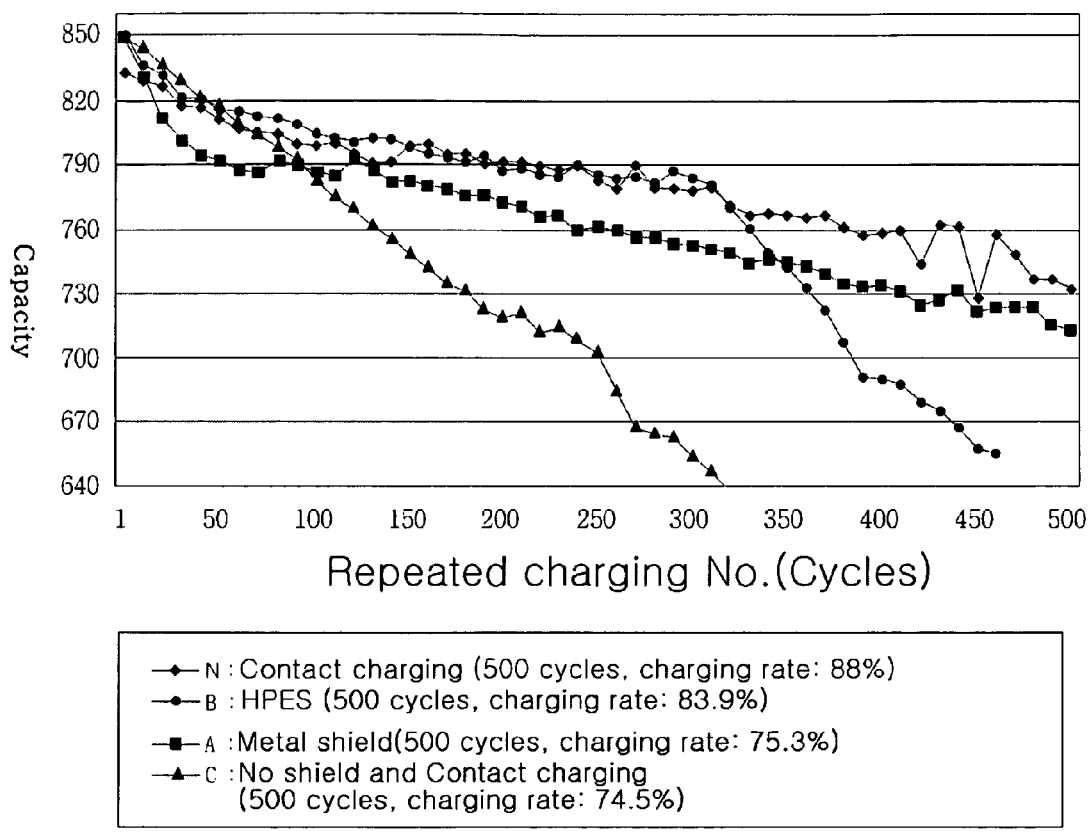
FIG. 21 is a graph showing charging efficiencies obtained through repeated charging/discharging experiments on the battery pack according to the present invention.

Also, FIGS. 13 to 18 are graphs illustrating charging efficiencies according to the extent where a battery pack goes away from the wireless charger system according to the present invention, FIGS. 19 and 20 are an exploded perspective view and a side cross-sectional view showing a configuration of the battery pack according to the present invention, respectively, and FIG. 21 is a graph showing charging efficiencies obtained through repeated charging/discharging experiments on the battery pack according to the present invention.

That is to say, the wireless charger system (A) for a battery pack solution according to the present invention includes a wireless charger apparatus 10 for receiving a power source from the outside and transmitting a power signal via a charging power transmitter block 15 in a wireless mode; and a battery pack 20 for receiving a power signal from the wireless charger apparatus 10 in a wireless mode to charge a battery cell with a power and supplying a power source to a portable terminal block 30, as shown in FIGS. 1 to 21.

For the wireless charger system (A), the expression 'battery pack solution' means that the wireless charger system (A) is used to supply a power source to the portable terminal block 30, wherein a wireless charger apparatus 10 and a portable terminal block are configured on the basis of the battery pack according to the present invention, and a power source is supplied through their systematic relation to stably supply and charge a power source.

The above-mentioned wireless charger system (A) for a battery pack solution is provided with a wireless charger apparatus 10 for supplying a power to the battery pack 20 as shown in FIGS. 1 and 2, wherein the wireless charger apparatus 10 is provided with a power receiver block for receiving a power source from the outside, and converts a power of the power receiver block 12 and transmits the converted power from the charging power transmitter block 15 in a wireless mode.

In particular, the wireless charger apparatus 10 has an outer body composed of a resonant converter for supplying power to the battery pack 20 and a wireless charger case 101 having a central controller installed inside.

And, the wireless charger case 101 has a protruded round portion 102 formed around the rear thereof, a front portion 103 formed around the front thereof, and a battery pack positioning block 104 formed between the protruded round portion 102 and the front portion 103. Therefore, the protruded round portion 102 is formed to surround the rear edge of the wireless charger case 101, and a display block 19 is provided in the front portion 103 that is a slop surface formed in the front thereof.

Also, the battery pack positioning block 104 has a flat surface formed between the protruded round portion 102 and the front portion 103, and is formed with a lower height than the protruded round portion 102 and the front portion 103. Therefore, it is possible to prevent the battery pack 20 disposed on the battery pack positioning block 104 from being detached out when the battery pack 20 is on charge. In addition, a fixing belt, which is attachable/detachable with a velcro tape, may further provided to prevent the battery pack 20 from being shaken on charge.

As a result, the fixing belt is provided so that a power can be supplied to the battery pack 20 that is disposed on the battery pack positioning block 104 having a primary core block 151 installed inside, the primary core block 151 functioning to transmit a power supplied to the battery pack 20.

Also, according to the concrete configuration of the power receiver block 12 in the wireless charger apparatus 10, the power receiver block 12 may include a USB receiver port 121a for receiving a power and a control signal from USB ports of notebook computers or computers; a power outlet 121b for receiving a conventional power source from the outside; and a cigar connection port 121c coupled to a cigar jack of an automobile to receive a power in motions. Also, the power receiver block 12 is provided with an input power processor block 122 for converting a suitable power to the wireless charger apparatus 10 according to the current types that is coupled to the USB receiver port 121*a*, the power outlet 121*b* and the cigar connection port 121*c* to supply a power thereto. And, the power receiver block 12 is provided with a power control block 123 for control a power transmitted from the USB receiver port 121*a*, the power outlet 121*b*, and the cigar connection port 121*c* to control an input power, and also control a power supplied to components of the central controller 11, the charging power transmitter block 15 and the wireless charger apparatus 10.

In addition, the wireless charger system (A) is provided with a resonant converter 14 for converting an output signal including a power signal and a data signal, both of which are supplied from the power receiver block 12, and supplies a power signal and a data signal from the resonant converter 14 to the charging power transmitter block 15 provided with a primary core block 151.

Also, one side of the gate driver 13 provided with a bootstrap gate drive is coupled to the power receiver block 12 to transmit the output signal including a data signal and a power signal to the resonant converter 14 formed in the other side of the gate driver 13, and controlled by the central controller 11.

In addition, the wireless charger system (A) is provided with a current detector block 16 coupled between the power receiver block 12 and the resonant converter 14 to detect a data signal of the battery pack 20 through the transmission operation by the primary core block 151. And, the wireless charger apparatus 10 is controlled by the central controller 11 for controlling the power receiver block 12, the resonant converter 14, the gate driver 13 and the current detector block 16.

Additionally, the wireless charger system (A) includes a display block 19 for displaying a state of the wireless charger apparatus 10 according to the control signal of the central controller 11.

Also, the battery pack 20 of the wireless charger system (A) for a battery pack solution is configured, as follows. That is to say, the battery pack 20 includes a secondary rectification circuit block 22 for converting an induced electromotive force so as to receives a power from the wireless charger apparatus 10 in a wireless mode, the induced electromotive force being generated in the secondary core block 21 by means of the induced magnetic field that is generated by the primary core block 151 of the wireless charger apparatus 10, as shown in FIG. 1.

Also, the battery pack 20 according to the present invention includes a battery pack controller 24, a battery pack charging circuit block 25, a data input/output block 26, a charge monitoring circuit block 27, and the like. In this case, the battery pack controller 24 functions to control the entire operation of the battery pack 20. Here, the battery pack controller 24 is coupled to the secondary rectification circuit block 22 to supply a charging power to the battery cell 23 and process data that is transmitted/received by the primary core block 151 and the secondary core block 21. Therefore, the battery pack controller 24 functions to transmit a data signal toward the wireless charger apparatus 10, the data signal including a charging state of the battery pack 20, an error state of the battery pack 20 and a signal value of the native ID.

Additionally, the battery pack charging circuit block 25 is controlled under the control of the battery pack controller 24 and provided to supply a power, supplied from the secondary rectification circuit block 22, to the battery cell 23 and supply a power of the battery cell 23 to the portable terminal block 30. Also, the battery pack 20 is also provided with a charge detector block 251 for detecting a charging level of the battery cell 23.

Also, the data input/output block 26 function to transmit/receive data to/from a data terminal processor block 31 of a portable terminal block 30 under the control of the battery pack controller 24 relative to the data transmitted/received to/from the wireless charger apparatus 10, and process the data.

Furthermore, the charge monitoring circuit block 27 functions to check a charging level of the battery cell 23 and transmit a fully-charged or discharged signal to the battery pack controller 24.

The battery pack 20 used in the wireless charger system (A) as configured thus may have a shape of an all-in-one hard pack, a built-in shape and a semi-inner pack according to the attachment and detachment to/from the portable terminal block 30. Here, the all-in-one hard pack may control a charging level in the battery pack without any limitation on the portable terminal block and generate a native ID to transmit the presence of foreign substances to the wireless charger apparatus. In this case the all-in-one hard pack is referred to as a battery pack having a configuration where a power may be supplied to the portable terminal block power. Also, the built-in shape means that the above-mentioned battery pack is provided inside the portable terminal block, and the semi-inner pack means that the above-mentioned battery pack is detached from the portable terminal block, or coupled to the portable terminal block, thereby facilitating the charging and supply of the power.

That is to say, the battery pack 20 configured as shown in FIG. 11 may be used with its being attached/detached to/from the portable terminal block 30, and its charging may be carried out by disposing the battery pack 20, in the form of the all-in-one hard pack, on the battery pack positioning block 104 of the wireless charger apparatus 10. Main components of the battery pack 20 include a secondary core block 21 driven in a coil or core manner; a secondary rectification circuit block 22 for rectifying an induced electromotive force of the secondary core block 21; a battery cell 23; a battery pack charging circuit block 25; a charge monitoring circuit block 27 for monitoring and protecting a charging level of the battery pack during the charging operation of the battery pack (including a protection circuit module (PCM) circuit for preventing overcharging of the battery pack); and a terminal block 28 coupled to the charge monitoring circuit block 27 to supply a power source to the portable terminal block 30. Of course, the battery pack controller 24 monitors and controls the communication with the wireless charger apparatus 10, the supply of a power source to the portable terminal block 30, the charging level of the battery cell 23, the operation of the battery pack 20, etc. Therefore, the battery pack controller 24 may be configured so that LDO (Low Drop Out), ID (TX and RX communication), FET drives, battery charging state-input (empty or full signal) functions, oscillators, and port for enabling/disabling the charging circuit can be installed inside the battery pack controller 24.

Also, the main components of the battery pack may be provided so that they can be configured in a built-in shape by forming the battery pack integrally with the portable terminal block. That is to say, the secondary core block and the magnetic field shielding plate are formed integrally in a case cover disposed in the rear of the portable terminal block (a core may be injection-molded so that it can be formed integrally with a cover, or a protection case may be manufactured and provided in the core using an ultrasonic welding process), a secondary rectification circuit block and a wireless native ID recognition circuit are additionally formed as an inner circuit of the portable terminal block, and a DC/DC converter and a charging circuit installed inside the portable terminal block may be used by itself. For this purpose, the battery pack may be provided in a built-in shape.

In particular, the battery pack 20 may be provided in the form of a semi-inner pack in the present invention as shown in FIG. 12. That is to say, the battery pack 20 may include a secondary core block 21 driven in a coil or core manner; a secondary rectification circuit block 22 coupled to the secondary core block 21; a battery cell 23 (positive temperature coefficient (PTC) circuit installed inside); and a terminal block 28 coupled to the portable terminal block. Also, the battery pack controller 24 may be configured so that LDO (Low Drop Out), ID (TX and RX communication), FET drives, battery charging state-input (empty or full signal) functions, oscillators, and port for enabling/disabling the charging circuit can be installed inside the battery pack controller 24. Therefore, the portable terminal block 30 coupled to the terminal block 28 may be provided with a GSM charging control block that may control a charging level of the battery cell 23 while receiving a power source from the battery cell 23 or the battery pack controller 24 of the battery pack 20. This GSM charging control block may include a GSMDC/DC converter 33 (DC/DC converter block); and a GSM charging control block 34 coupled to the charge monitoring circuit block 27 that is coupled to a GSMDC/DC converter 33 to monitor a charging level of the battery cell 23. For the battery pack 20 in this form of a semi-inner pack, since the portable terminal block 30 is provided with circuits including the GSMDC/DC converter and the GSM charging control block, the portable terminal block coupled to the battery pack 20, in the form of an attachable/detachable semi-inner pack, through the terminal block is referred to as a 'GSM portable terminal block.'

Therefore, when the GSM portable terminal block having the battery pack 20 installed inside in the form of a wireless charging semi-inner pack is put on the battery pack positioning block 104 of the wireless charger apparatus 10, an induced magnetic field is formed in the wireless charger apparatus 10 to transmit a power to the battery pack in the secondary core block. Therefore, the battery pack 20 receives an AC induced electromotive force from the secondary core block 21, rectifies the AC induced electromotive force into a DC induced electromotive force in the secondary rectification circuit block 22, and transmits the DC induced electromotive force to the battery pack controller 24.

Therefore, a power may be regularly and stably received and charged in the battery pack controller by transmitting a signal for adjusting a power transmitted from the wireless charger to a constant voltage level. For example, assume that a voltage of a received power is set to a reference voltage of 5V. In this case, when the voltage of the received power exceeds 5.5V, a power save code signal is generated to reduce a power in the wireless charger 10, and therefore a parameter (frequency) of an induced magnetic field generated in the primary core block 151 is adjusted in the wireless charger apparatus 10 so that the power transmitted from the battery pack can be reset to a voltage of about 5V. Then, when the continuously received power is under the optimum voltage conditions such as 5V in the battery pack controller 24, information on the optimum voltage conditions is transmitted to the wireless charger apparatus 10, and a charging operation is then carried out in the wireless charger apparatus 10 until the completely charged signal is received from the wireless charger apparatus 10.

For this charging operation, when the information received from the wireless charger apparatus 10 is not a predetermined information on the native ID of the battery pack 20, an error is caused by recognizing as if foreign substances are put on the wireless charger apparatus 10.

The wireless charger system (A) according to the present invention, as configured thus, includes a wireless charger apparatus 10 and a battery pack 20, which are provided to operate the wireless charger system (A). Therefore, the display block 19 displays a state controlled according to the operation of the wireless charger apparatus 10, which allows a user to see the state.

That is to say, the wireless charger system is provided with a display signal receiver block 191 for receiving a control signal transmitted from the central controller 11 of the wireless charger apparatus 10. Here, the display signal receiver block 191 is coupled to the display signal receiver block 191 to turn on or off the LED 192, the LCD panel 193 and the icon LCD 194 according to the control signal transmitted from the central controller 11.

For this purpose, the display signal receiver block 191 includes an LED driver 195 coupled to the display signal receiver block 191 to turn on the LED 192 according to the control signal transmitted from the central controller 11; an LCD panel driver 196 coupled to the display signal receiver block 191 to turn on the LCD panel 193 according to the control signal transmitted from the central controller 11; and an icon LCD driver 197 coupled to the display signal receiver block 191 to turn on the icon LCD 194 according to the control signal transmitted from the central controller 11.

According to the detailed configuration of the display signal receiver block 191, the LED 192 is provided to emit light with a green or red color, the LCD panel 193 is provided to emit light with a blue or green color, and the icon LCD 194 is provided to emit light with a charging level as much as notch marks on a scale according to the signal of the charging level transmitted from the battery pack 20.

For this purpose, the LED driver 195 drives the LED 192 to be turned on with a green or red color under the control of the central controller 11, the LCD panel driver 196 drives the LCD panel 193 to be turned on with a blue or green color under the control of the central controller 11, and the icon LCD driver 197 is provided to turn on the icon LCD 194 with a blue or green color under the control of the central controller 11, and to emit the light as much as notch marks on a scale according to the control signal due to the charging level of the battery pack 20.

Referring to the operation of the wireless charger system (A) for a battery pack solution according to the present invention as configured thus, the wireless charger system (A) is provided with a wireless charger apparatus 10 for receiving a power source from the outside and transmitting a power signal via the charging power transmitter block 15 in a wireless mode, and also provided with a battery pack 20 for receiving a power signal from the wireless charger apparatus 10 in a wireless mode to charge the battery cell with a power and supplying a power source to the portable terminal block 30, and therefore the wireless charger system is controlled in the following steps.

That is to say, a state of the wireless charger apparatus 10 is checked and the charging operation is in a standby mode prior to charging externally supplies power sources in a wireless mode through the charging power transmitter block 15 of the wireless charger apparatus 10 (S01). Then, a call signal for a native ID of the battery pack 20 is transmitted to sense the battery pack 20 through the charging power transmitter block 15 of the wireless charger apparatus 10 (S02).

Subsequently, the signal for the native ID transmitted from the wireless charger apparatus 10 is received in the battery pack 20 to transmit information on a native ID value and the state of the battery pack via the secondary core block 21 of the battery pack 20 (S03), the native ID value being stored in the native ID transmission block 241 of the battery pack 20.

As described above, a state of the battery pack 20 is determined by determining the native ID value of the battery pack transmitted from the battery pack 20 (S04).

Then, when the battery pack 20 is detected and ready to be charged, a power is transmitted via the charging power transmitter block 15 of the wireless charger apparatus 10, and therefore the battery pack 20 is charged by receiving a power (S05).

Also, the battery pack 20 is charged in the step of charging the battery pack. When the charging of the battery cell is completed, a signal, such as a state displaying the charging is completed in the battery pack, is transmitted to the wireless charger apparatus 10, and the signal is sensed in the wireless charger apparatus 10 (S06).

Also, when the information on the completely charged signal is received from the battery pack 20, the charging operation is suspended under the control of the central controller 11 of the wireless charger apparatus 10, and waiting to receive information on the charging level from the battery pack 20 and the state of the battery pack (S07).

In the step of waiting for information on the battery pack, it is checked that battery pack 20 is continuously sensed. When the battery pack is not sensed, a call signal is continuously transmitted to check that there is a newly sensed battery pack. Then, when a new battery pack is sensed, a native ID value of the battery pack is called, and then a normal operation and a charging level of the battery pack are determined when the native ID value is proven to be a suitable battery pack ID. Then, when the charging of the battery pack is completed, the battery pack is continuously in a standby mode. On the contrary, when the charging of the battery pack is proven to be required, a charging operation of the wireless charger apparatus 10 is carried out.

For the wireless charger system (A) for a battery pack solution according to the present invention as configured thus, an operation of the display block 19 of the front portion 103 according to the operations of the wireless charger apparatus 10 and the battery pack 20 will be described in detail, as follows.

Figure 3:
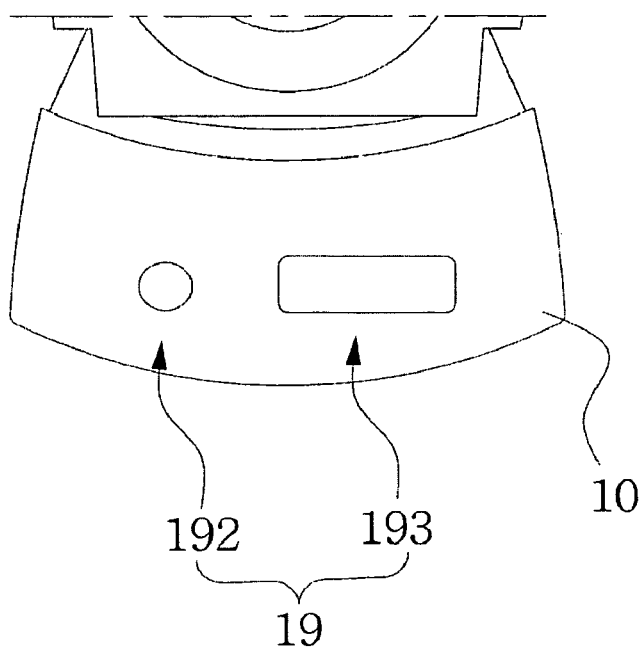
FIGS. 3 to 7 are schematic illustrative views showing a display state on a display block of the wireless charger system according to the present invention.

That is to say, the step of waiting for the charging of a battery pack (S01) including a step of displaying a charging-standby state (S011). In this step (S011), a signal for the charging-standby state is transmitted from the central controller 11 to the display block 19 to turn off the LED 192 and the LCD panel 193, as shown in FIG. 3. Therefore, the LED 192, the LCD panel 193 and the icon LCD 194 are displayed as a turn-off state.

Figure 4:
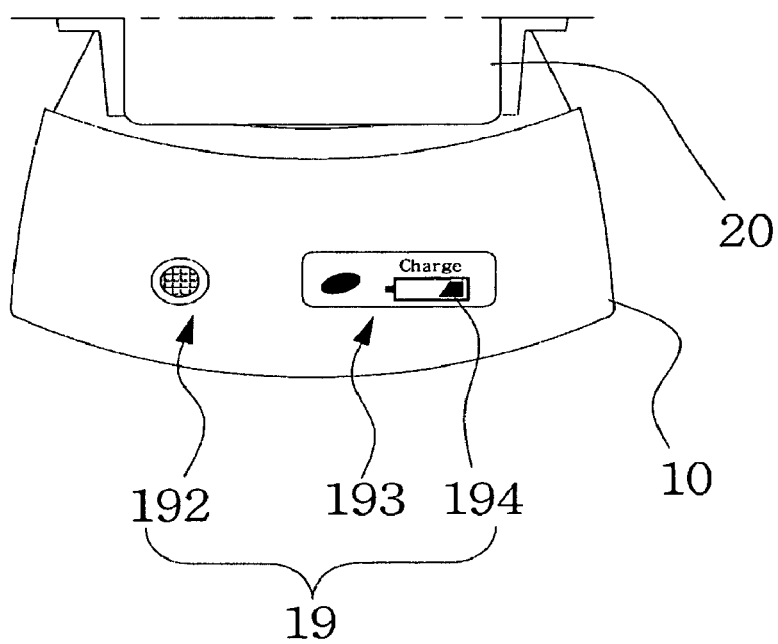

Also, the step of transmitting a call signal for a native ID (S02) includes a step of displaying a native ID call state (S021). In this step (S021), the LED 192 and the LCD panel 193 transmit a control signal to the LED driver 195, the LCD panel driver 196 and the icon LCD driver 197 to display a native ID call state, as shown in FIG. 4. Therefore, the LED 192 is turned on with a green (LED green) color, and the LCD panel 193 is turned on with a blue (LCD blue) color.

Figure 5:
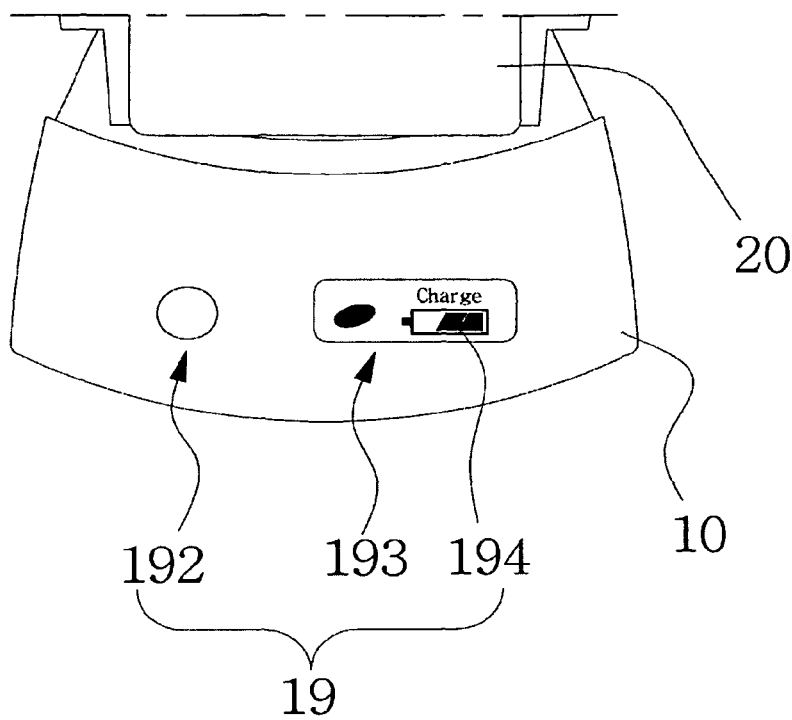

In addition, the step of charging a battery pack (S05) includes a step of displaying a charging state. In this case, the LED 192 and the LCD panel 193 transmit a control signal to the LED driver 195, the LCD panel driver 196 and the icon LCD driver 197 to display a charging state, as shown in FIG. 5. Therefore, the LED is turned off, and the LCD panel 193 is displayed with a blue color. And, the icon LCD 194 is displayed with a blue color, but notch marks are increased one by one according to the charging state from a period that the notch marks are not displayed according to the charging of the battery cell as the power is consumed. Therefore, the notch marks in the charging level are displayed from 0 through one, two to three, and therefore it is possible to check the charging state according to the notch marks.

In the similar manner, the step of receiving information on a completely charged signal (S06) includes a step of displaying a completely charged state (S061). In this case, the LED 192 and the LCD panel 193 transmit a control signal to the LED driver 195, the LCD panel driver 196 and the icon LCD driver 197 so that the battery pack 20 can be displayed in a completely charged state, as shown in FIG. 6. Therefore, the LED 192 is turned off/on with a green color (LED green blinking), and the LCD panel 193 is turned off/on with a green color (LCD green blinking). Also, the icon LCD 194 is turned off/on with a green color together with the LCD panel 193, and all of the notch marks are turned off/on at the same time.

Also, the step of waiting for the charging of a battery pack (S01) further includes a step of displaying an error signal (S012). In this case, the LED 192 and the LCD panel 193 transmits a control signal to the LED driver 195, the LCD panel driver 196 and the icon LCD driver 197 to display an error state when a signal for foreign substances, which is different from the native ID value of the battery pack, is sensed from the charging power transmitter block 15 of the wireless charger apparatus 10, as shown in FIG. 7. Therefore, the LED 192 is turned on with a red color (LED red), and the LCD panel 193 is turned off (LCD off). Therefore, it is possible to allow a user to easily observe the operation of the display block 19 with the naked eye in the front of the display block 19, the display block 19 being formed in the front portion 103 of the wireless charger apparatus 10, and also to check the operation of the wireless charger system (A).

TABLE 1

| Status | Display blocks | | | Particulars |
| --- | --- | --- | --- | --- |
| | LED | LCD panel | icon LCD | |
| Standby mode | OFF | OFF | OFF | Normal, substances detected in standby mode |
| ID call mode | GREEN | BLUE | BLUE | ID detected when a battery pack is put on a charger |
| Charging mode | OFF | BLUE | BLUE (notch marks) | Display that a battery pack is on charge |
| Completely charged mode | GREEN | GREEN | GREEN | Display that a battery pack is fully charged |
| Display mode of error signals | RED | OFF | OFF | Erroneous Temp., ID error, alarming the detection of foreign substances |

In FIGS. 3 to 7, it is shown that a turn-off state is represented by a blank figure in Table 1, GREEN is represented by slashes of vertical/horizontal line segments, BLUE is represented by a filled black color, and RED is represented by filled dots.

The configuration and operation of the wireless charger system (A) for a battery pack solution according to the present invention, as configured thus, will be described in detail, as follows.

That is to say, for the wireless charger system (A) for a battery pack solution according to the present invention, an input power source of the wireless charger apparatus 10 may includes a conventional external input power source, a cigar power source that may be received in motion of vehicles, and a power source for a USB port input that may be received from computers and notebook computers. The wireless charger apparatus 10 receiving the input power source includes a battery pack for supplying a power source to a portable terminal block; and an apparatus for transmitting a power in a wireless mode using an induced electromotive force. Here, the portable terminal block may include mobile phones, PDA, MP3 players, DAB, DMB terminals, PMP, Handheld terminals, etc.

In particular, when foreign substances such as metals other than the battery pack (a pack having secondary wireless charger module installed inside) of the portable terminal block to be charged are put on the charging power transmitter block that is a charger block of the wireless charger apparatus 10, the charging power transmitter block has a function to sense the foreign substances and suspend the wireless charging operation, and also has a function to recognize the battery pack of the portable terminal block to check a charging state. Also, the charging power transmitter block functions to prevent an overload when a wireless charging apparatus is taken into action, and also has a temperature protection function.

Also, the battery pack 20 includes a rectification circuit block, a native ID transmission block 241, a charging circuit block, a protection circuit block, a battery cell, etc. Here, the battery pack 20 may be installed inside the portable terminal block, and also be charged when it is detached from the portable terminal block.

That is to say, an induced magnetic field is generated in a charging module of a primary core block by using a DC input source power source into which a power source for USB ports of computers, and a power source inputted from an AC adapter, a cigar Jack and the like are converted. Therefore, a voltage is always adjusted to a constant voltage level in a rectifier end of the secondary core block that is the battery pack.

Therefore, a power is controlled in the primary wireless charger apparatus 10 by using a frequency automatic variable algorithm, but an induced magnetic field is formed with an LC resonance by performing a switching operation every certain time. This mode is referred to as a standby mode. The primary wireless charger apparatus 10 waits for a response from the secondary battery pack by means of the induced magnetic field. In this case, the primary wireless charger apparatus 10 waits for an acknowledge response signal from the secondary battery pack by transmitting a request (FSK signal) signal in a standby mode. Therefore, when a response signal from the secondary battery pack is not received, a standby mode in which a request (FSK) signal is transmitted is continuously carried out. Then, when a response signal from the battery pack is detected by the signal detector block 163 coupled to the primary core block 151, the signal detector block 163 analyzes the response signal to determine whether a charging operation is carried out.

The induced magnetic field, which is transmitted by the standby mode as described above, may be transmitted via the charging power transmitter block 15 formed on the wireless charger apparatus 10. In this case, the battery pack is not properly disposed in the charging power transmitter block 15, and a response to the load modulation is not generated as a signal such as a normal signal from the battery pack when foreign substances such as metals are put on the charging power transmitter block 15. The wireless charger apparatus 10 is provided with a temperature detector block 162 so as to prevent the wireless charger apparatus 10, particularly a primary core block, from being overheated by the metal foreign substances as the reaction of the abnormal response generated when the foreign substances are put on the charging power transmitter block 15. And, the temperature detected by the temperature detector block 162 is transmitted to the central controller to adjust the intensity of the induced magnetic field according to the overheating of the primary core block.

Also, when overcurrent and overvoltage are detected by the current detector block 16 for detecting a current flow of the wireless charger apparatus 10, the current flow may be intercepted or adjusted by the central controller 11. When an abnormal state is detected by the temperature detector block 162 and the current detector block 16 in the wireless charger apparatus 10 as described above, the abnormal state is converted into the step of displaying an error signal in the central controller 11, and then displayed on the display block 19. In addition, when dusts or bed smells are caused, a dust sensor circuit 165 senses the dusts or bed smells, and therefore it is possible to remove the dusts or bed smells by generating ions in the ionizer transmission block 164.

Also, an induced magnetic field is formed in the primary core block 151 of the wireless charger apparatus 10, and then sensed in the secondary core block 21 of the battery pack 20, as shown in FIG. 2. Accordingly, an AC power derived from a coil is rectified into a DC power in the secondary rectification circuit block 22 during a period that an AC power is turned on, and a power source is supplied to the battery pack controller 24 (adapter control block). Therefore, when the battery pack controller 24 receives a primary frequency shift keying (FSK) code from a RXD signal line, and the primary FSK code is matched with a code signal of the native ID transmission block 241, the primary FSK code is recognized as an acknowledge to generate a native ID data value of the native ID transmission block 241. Then, the native ID data value is transmitted to a primary side through the load modulation, and the native ID data value of the battery pack transmitted via the primary core block 151 is detected to be a normal signal in the signal detector block 163 of the wireless charger apparatus 10. And, a signal is transmitted to the central controller 11 to determine whether the native ID data value is a normal native ID data value. In this case, when the native ID data value is a normal native ID data value, the power receiver block 12, the gate driver 13, the resonant converter 14 and the like are controlled so that they can be switched in a full-power mode for the entire period to generate an AC power. Therefore, a wireless induced magnetic field is generated in the charging power transmitter block 15. Of course, the induced magnetic field is transmitted together with a frequency when the induced magnetic field is transmitted from the charging power transmitter block 15 in this manner, and therefore an induced magnetic field is generated when a signal is transmitted/received between the wireless charger apparatus 10 and the battery pack 20. Also, the central controller 11 performs the step of charging a battery pack by displaying a charging state on the display block 19.

Also, when the native ID data value is not proven to be a normal native ID data value, the native ID data is recognized as a foreign substance to transmit an error signal (a step of displaying an error signal). Of course, the battery pack is controlled not to transmit a power. And, the battery pack is maintained to a standby mode in which the normal native ID data value of the battery pack is requested (a step of waiting for charging of a battery pack).

In addition, a power signal transmitted by the primary core block 151 of the wireless charger apparatus is transmitted via the secondary core block 21 of the battery pack, and this power signal is used as Vsense to sense the intensity of an input voltage. Therefore, when the signal detector block 163 detects, for example, a voltage of the received power to be a stable voltage of about 5V, the signal detector block 163 maintains the voltage of the received power to a constant voltage level. And, when a voltage of the received power is received as a low voltage value or a too high voltage value, information on the voltage adjustment is used as load modulation. In this case, the information is transmitted to the wireless charger apparatus 10 to maintain a constant voltage level. As a result, when the information on the voltage adjustment is adjusted to a constant voltage level, an operation of a charging IC in the battery pack charging circuit block 25 is in an active state to charge the battery cell 23 with a power. When the battery cell 23 of the battery pack 20 is charged with a power transmitted from the wireless charger apparatus 10 as described above, the battery cell 23 is stably charged by determining the stability of the battery cell 23 in the charge monitoring circuit block 27 in charging the battery cell 23.

Also, the charge detector block 251 senses a charging level of the battery cell 23. Therefore, when the battery cell 23 is completely charged, the charge detector block 251 senses the completely charged state to recognize the completely charged state as an active high signal and transmits the active high signal to the battery pack controller 24. Here, the active high signal is transmitted to the primary core block 151, and then transmitted to the wireless charger apparatus 10 together with the native ID code value. Then, the central controller 11 of the wireless charger apparatus 10 is converted into a standby mode by suspending the charging operation, and displays the completely charged state on the display block 19 (a step of receiving information on a completely charged signal).

During the charging operation of the wireless charger system (A) for a battery pack solution that is composed of the wireless charger apparatus 10 and the battery pack 20, when the power transmitted from the battery pack 20 has a lower voltage value than the reference voltage as a position of the battery pack 20 disposed on the charging power transmitter block 15 of the wireless charger apparatus 10 is changed to another position, a signal is transmitted to the wireless charger apparatus 10 to supplement this voltage value. For example, where it is assumed that the reference voltage is set to 5V and the reference deviation value is set to 0.5V, the battery pack controller 24 controls a transmission signal to be boosted by about 0.5V when a voltage of less than 4.5V is received due to the movement of the battery pack 20. Then, the wireless charger apparatus 10 enhances a transmission power of the primary core block to boost a voltage by 0.5V and transmits the boosted induced magnetic field. Therefore, an oscillation frequency is changed, for example, in a manner for enhancing a transmission power that is outputted from the wireless charger apparatus 10.

When the transmission power transmitted from the wireless charger apparatus 10 is enhanced as described above, charging efficiencies to the changes in distance of the battery pack 20 from the battery pack positioning block that is a cradle of the wireless charger apparatus 10 are shown in FIGS. 13 to 18. That is to say, FIGS. 13 to 16 show the results of a primary power (W) in the wireless charger apparatus and secondary power (W) and efficiency (%) in the battery pack when a secondary reference power of the battery pack is set to about 2.5 W and a position of the battery pack moves by −7 mm ~7 mm in a horizontal direction and a vertical direction, respectively. Here, the efficiency (%) is represented by an efficiency of an output power to a primary input power of the wireless charger apparatus ((secondary power/primary power)*100), the output power being applied to a secondary side of the battery pack.

Figure 13:
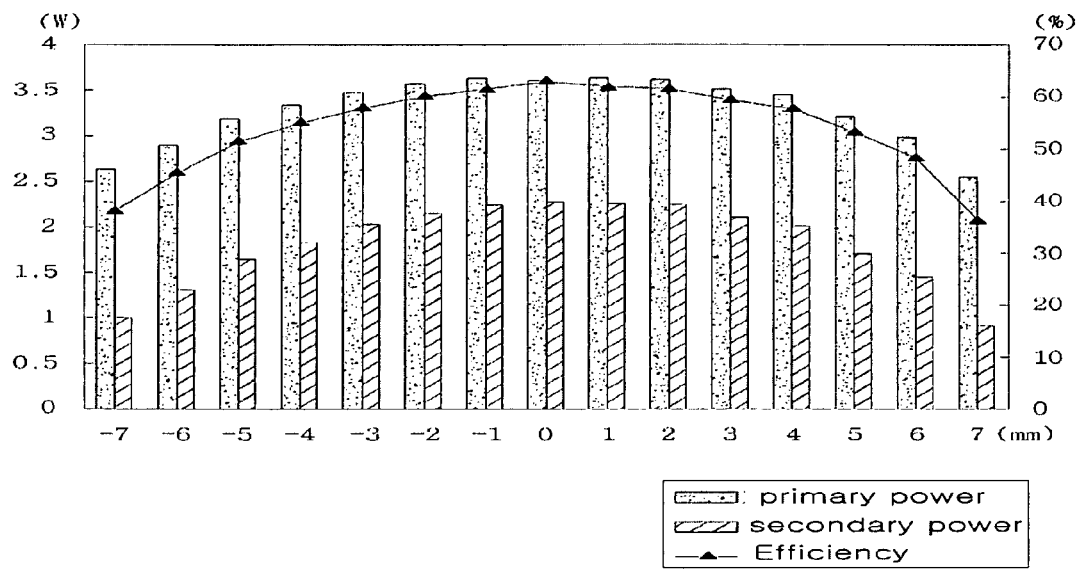
Figure 15:
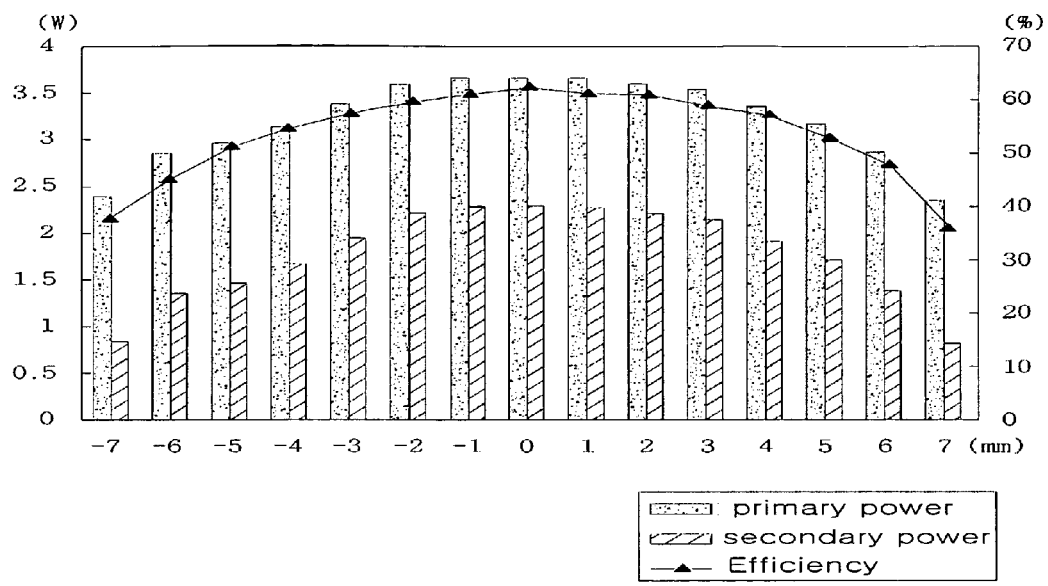

Also, the compensation of the transmission power is adjusted to 0.5 W according to the present invention, and therefore FIGS. 13 and 15 show graphs that is plotted in a secondary power of 2~2.5 W in the case of the battery pack, which indicates the charging efficiency when the battery pack is charged without the changed in frequency in the wireless charger apparatus 10 relative to the changes in horizontal distances and vertical distances of the wireless charger apparatus 10 and the battery pack 20. That is to say, when the battery pack 20 moves in a horizontal distance or a vertical distance relative to the wireless charger apparatus 10, a secondary power of the battery pack 20 drops as the secondary power goes away from the center, which leads to the decreasing efficiency.

Figure 14:
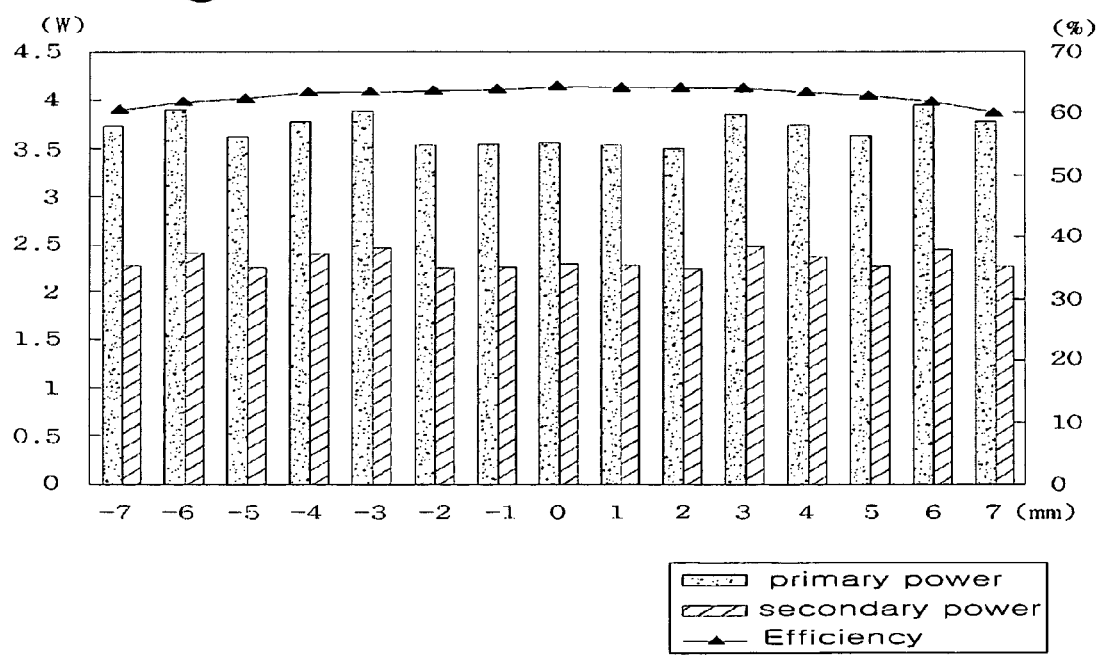
Figure 16:
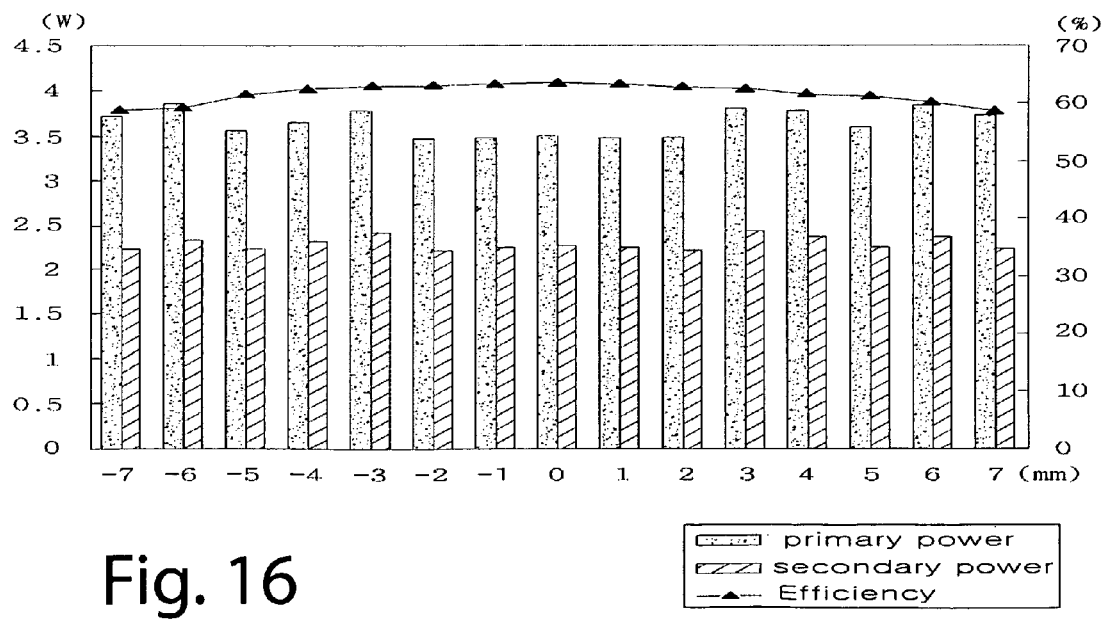

Therefore, from FIGS. 14 and 16, it is revealed that the wireless charger apparatus 10 receives information on the change in the power received from the battery pack, and thus controls a power by changing a frequency as the battery pack 20 moves from the battery pack positioning block, which is a cradle disposed on the wireless battery pack 10, in a horizontal distance and a vertical distance respectively, compared to FIGS. 13 and 15. In this case, it is seen that the power is transmitted stably, and therefore the transmission efficiency of the power is good.

Also, FIG. 17 shows a graph plotting an efficiency to the movement of the battery pack 20 in a horizontal direction, and FIG. 18 shows a graph plotting an efficiency to the movement of the battery pack 20 in a vertical direction. Here, it is revealed that the efficiency is better when there is a change in frequency (an upper rectangular dots graph, POWER CONTROL) than when there is no change in frequency (a lower curve graph, FIXED POWER).

According to the wireless charger system (A) for a battery pack solution that is composed of the wireless charger apparatus 10 and the battery pack 20, a power source is supplied to the portable terminal block 30, wherein an input power such as a power for computers and notebook computers using a USB port, an external power used as a power outlet, a mobile power used as a cigar connection port in vehicles is easily supplied to a portable terminal block.

In particular, a charging state may be easily checked through the display state on the display block 19 of the wireless charger apparatus 10 according to the operation of the wireless power charging system (A).

In addition, the wireless charger system according to the present invention is provided with a shielding member to protect the battery pack from the magnetic field generated by the primary core block 151 of the wireless charger apparatus 10 and the secondary core block 210 of the battery pack 20, as shown in FIGS. 19 to 21.

First of all, FIG. 19 is an exploded perspective view showing a configuration of a wireless battery pack 20 having a wireless power receiver module. Here, a battery pack composed of coil, fine metal, thin aluminum film (foil, etc.), lithium ion or lithium polymer has no effect on cells since a thin aluminum film is introduced into the battery pack to completely cut off the magnetic field, which allow the cells to be charged/discharged at cell cycles of 500 or more. Here, the shapes of the core include all kinds of cores. That is to say, the shapes of the core may include a rectangular shape, a round shape or an oval shape, and various cores such as a winding coil, a spiral core and the like may be provided herein. In this case, the wireless battery pack 20 having a wireless power receiver module includes a wireless power receiver circuit including a battery pack controller 24 and a charging circuit block 25, both of which are formed in one side of the charging battery cell 213, and the wireless power receiver circuit 223 may include a shielding member 219 for preventing a surrounding magnetic field.

Also, the wireless battery pack 20 is provided with shielding plates 214, 215, 216, 217 and 218 provided in the bottom, the front, the rear, the left side and the right side of the charging battery cell 213 to protect the charging battery cell 213 from the magnetic field of the primary core block and the secondary core block 210 by shielding the magnetic field.

Then, since the five regions, for example, the front, the rear, the left side, the right side and the bottom of the charging battery cell 213 are provided respectively with the shielding plates 214, 215, 216, 217 and 218 to cut off the magnetic field generated by the primary core block and the secondary core block 210, it is possible to prevent damage of the charging battery cell 213 from the magnetic field. Therefore, an additional shielding plate may be provided in an upper surface of the charging battery cell 213, when necessary. In this case, it is desirable when temperature is not increased due to the completely closed surroundings of the charging battery cell 213.

As described above, the shielding plates 214, 215, 216, 217 and 218 and the shielding member 219 may be formed of thin discs including Al, Cu, Ni Alloy metals.

Also, a magnetic plate 29 is formed between the shielding plates 214 and the charge receiver module 212 to facilitate the induction of the magnetic field induced from the secondary sore 210, the shielding plates 214 formed in the bottom of the charging battery cell 213. This magnetic plate 29 includes amorphous ferrites, Mn—Zn (50 parts by weight:50 parts by weight), Ni—Fe (80 parts by weight:20 parts by weight), fine metals (Fe—Si—Cu—Nb), etc.

The magnetic plate 29 may be composed of an upper magnetic plate 291 formed between the shielding plates 214 and the charge receiver module 212; and a lower magnetic plate 252 disposed in a lower portion of the charge receiver module 212. Therefore, the lower magnetic plate 292 has a lower plate thorough hole as a thorough hole passed through the center thereof. This shape of the lower plate thorough hole 293 is preferably formed with the same shape as the core of the secondary core block 210. For example, FIG. 19 shows that the lower plate thorough hole 293 of the lower magnetic plate 292 is formed with a round shape since the secondary core block 210 is formed of a round core. However, when the core is formed with a rectangular shape or a polygonal shape, the lower plate thorough hole 293 is preferably formed with the same shape. Therefore, an induced electromotive force is easily generated in the secondary core block 210 due to the presence of the lower plate thorough hole 293, the secondary core block 210 being that is present within the induced magnetic field, and the signal may be transmitted/received in an easy manner.

Also, the magnetic plate 29 is provided with an insulating plate 211 that is provided between the shielding plates 214 and the charging battery cell 210 to insulate the charging battery cell 210, the shielding plates 214 being formed in the bottom of the charging battery cell 210. Since this insulating plate 211 is formed in the form of a mesh or thin film that is made of Ni—Cu, the heat of the shielding plates 214 is not delivered to the charging battery cell 213.

As another example of the magnetic field shielding member, the magnetic plate 29 is provided with a magnetic plate 29 (a primary HPES: Hanrim Postech Electro-magnetic shield) formed between an aluminum-based battery cell case 213' and the secondary core block 210 as shown in FIG. 20, the aluminum-based battery cell case 213' constituting an outer body of the battery cell 213. In this case, a shield mesh member 294 is further provided as a secondary HPES between the magnetic plate 29 (i.e., a primary HPES) and the battery cell case 213.' The magnetic plate 19 as a primary HPES and the shield mesh member 294 as a secondary HPES may be composed of the same components as in the above-mentioned shielding member.

It is known that most of the magnetic field is shielded by the magnetic plate 29 that is a primary HPES. As shown in FIG. 20, it is revealed that a line of magnetic force does not affect a battery cell since the line of magnetic force is bent by the magnetic plate 29 that is a shielding plate. As a result, the heat is generated in a peak region by the line of magnetic force, and then radiated out by the metallic magnetic plate 29. In addition, the shield mesh member 294 as a secondary HPES is formed by coating a metal mesh with a coating agent selected from the group consisting of amorphous ferrites, Mn—Zn (50 parts by weight:50 parts by weight), Ni—Fe (80 parts by weight:20 parts by weight), or fine metals (Fe—Si—Cu—Nb). Therefore, the secondary HPES functions to shield the magnetic field that is not shielded by the magnetic plate 29 that is a primary HPES. An eddy current is formed by excessive line of magnetic force in the metal mesh of the shield mesh member 294 that is a secondary HPES. In this case, the battery pack should be affected by the magnetic field that is generated by the primary core block and the secondary core block due to the presence of the eddy current formed in the metal mesh. In this experiment, it is revealed that about 90% of the magnetic field is shielded by the magnetic plate 29 that is a primary HPES, and about 10% of the magnetic field is shielded by the shield mesh member 294 that is a secondary HPES.

The battery pack 20 including the magnetic plate 29 as a primary HPES and the shield mesh member 294 as a secondary HPES is used to repeat a charging experiment (500 cycles) for the charging efficiency. FIG. 21 shows a graph that is plotted using an 80% efficiency curve as the reference curve (hereinafter, referred to as "standard efficiency line segment" (D)), the 80% efficiency curve being obtained through the repeated charging/discharging of a battery pack at 500 cycles and referred to as a stable charging efficiency. First, when the battery pack 20 is generally charged through electrical contacts without the exposure to the magnetic field (a graph represented by "N" in FIG. 21), the experiment of the battery pack 20 is carried out so that the charging capacities can be plotted over the standard efficiency line segment, which indicates that the charging/discharging efficiency is stable in the battery pack.

Accordingly, for the battery pack 20 according to the present invention, it is shown that the charging/discharging efficiency by the magnetic plate 29 as a primary HPES and the shield mesh member 294 as a secondary HPES (a graph represented by "A" in FIG. 21) is stable with an efficiency of 83.9% on the basis of 500-cycle charging/discharging experiment.

However, when the secondary HPES is not used in the battery pack 20, it is shown that the charging/discharging efficiency (a graph represented by "B" in FIG. 21) is rather low with an efficiency of 75.3% on the basis of 460-cycle charging/discharging experiment. When the primary HPES and the secondary HPES are not used in the battery pack 20, it is shown that the charging/discharging efficiency (a graph represented by "C" in FIG. 21) is very low with an efficiency of 74.5% in the charging/discharging experiment at 340 cycles that are far away below the 500 cycles. However, it is revealed that the battery pack 20 according to the present invention shows a highly excellent charging/discharging efficiency.

While the present invention has been shown and described in connection with the exemplary embodiments, it will be apparent to those skilled in the art that modifications and variations can be made without departing from the spirit and scope of the invention as defined by the appended claims.

The invention claimed is:

1. A wireless charger system for battery pack solution, comprising:
   a wireless charger apparatus for receiving a power source from the outside to transmit a power signal via a charging power transmitter block in a wireless mode; and
   a battery pack for receiving a power signal from the wireless charger apparatus in a wireless mode to charge power in a battery cell and supplying a power source to a portable terminal block,
   wherein the wireless charger apparatus has an outer body composed of a resonant converter for supplying power to the battery pack and a wireless charger case having a central controller installed inside,
   wherein the wireless charger case has a protruded round portion formed around a rear edge and a display block provided as a sloped surface in a front portion thereof, wherein a flat surface is formed between the protruded round portion and the front portion and a battery pack positioning block formed therein, the battery pack positioning block having a lower height than the protruded round portion and the front portion, and
   wherein a primary core block for transmitting power supplied to the battery pack is installed inside the battery pack positioning block to supply power to the battery pack disposed on the battery pack positioning block.

2. The wireless charger system according to claim 1, wherein the wireless charger apparatus comprises:
   a power receiver block for receiving a power source from the outside;
   a resonant converter for converting an output signal including a power signal and a data signal supplied from the power receiver block and transmitting the converted output signal to a charging power transmitter block provided with a primary core block;
   a gate driver coupled to the power receiver block to transmit an output signal including a data signal and a power signal to the resonant converter, the gate driver being controlled by the central controller and provided with a bootstrap gate drive;
   a current detector block coupled between the power receiver block and the resonant converter to detect a data signal of the battery pack through the transmission operation by means of the primary core block;
   a central controller for controlling the power receiver block, the resonant converter, the gate driver and the current detector block; and
   a display block for displaying a state of the wireless charger apparatus according to the control signal of the central controller.

3. The wireless charger system according to claim 1, wherein the battery pack comprises:
   a secondary rectification circuit block for converting a power that is induced through a secondary core block by an induced magnetic field generated by a primary core block of the wireless charger apparatus;
   a battery pack controller coupled to the secondary rectification circuit block to supply a charging power to a battery cell, to process data transmitted/received by the primary core block and the secondary core block and to transmit data signals for a charging state of the battery pack, an erroneous state of the battery pack and a native ID signal value;
   a battery pack charging circuit block for supplying power to the battery cell, the power being supplied from the secondary rectification circuit block under the control of the battery pack controller, and supplying a power of the battery cell to the portable terminal block;
   a data input/output block for transmitting/receiving data to/from a portable terminal block under the control of the battery pack controller relative to the data transmitted/received to/from the wireless charger apparatus, and processing the data; and
   a charge monitoring circuit block for checking a charging level of the battery cell and transmitting a fully-charged or discharged signal to the battery pack controller.

4. The wireless charger system according to claim 3, wherein the secondary core block has a core formed in a shape selected from the group consisting of a round shape, a rectangular shape, an oval shape and a polygonal shape,
   wherein the battery pack is attachable/detachable to/from the portable terminal block and has an all-in-one hard pack shape in which a power source stored in the battery cell is connected to a terminal block,
   wherein the secondary core block is formed integrally in the rear of the portable terminal block and has a built-in shape in which a circuit configuration of the battery pack is configured inside the portable terminal block together, or
   wherein the battery cell is formed in the battery pack and has a battery pack charging circuit block coupled through the terminal block, the battery pack charging circuit block 34 being provided inside the portable terminal block.

5. The wireless charger system according to claim 1, wherein the display block comprises:
   a display signal receiver block for receiving a control signal transmitted from the central controller;
   a light emitting diode (LED), a liquid crystal display (LCD) panel and an icon LCD, all of which are turned on according to the control signal transmitted from the central controller;
   an LED driver coupled to the display signal receiver block to turn on the LED according to the control signal transmitted from the central controller;
   an LCD panel driver coupled to the display signal receiver block to turn on the LCD panel according to the control signal transmitted from the central controller; and
   an icon LCD driver coupled to the display signal receiver block to turn on the icon LCD according to the control signal transmitted from the central controller.

6. The wireless charger system according to any one of claims 1 to 5, wherein the battery pack comprises:
   a charge receiver module having a secondary core block coiled therein;
   shielding plates surrounding the bottom, the front, the rear and the left and right sides of the charging battery cell and made of Al, Cu, or Ni Alloy metals to protect the charging battery cell from the magnetic field;
   a magnetic plate provided between the shielding plates and the charge receiver module and containing ferrites, Mn—Zn (50 parts by weight:50 parts by weight), Ni—Fe (80 parts by weight:20 parts by weight), or fine metals (Fe—Si—Cu—Nb) to induce an induced magnetic field into the secondary core block;

an insulating plate formed between the shielding plates and the charging battery cell and formed of mesh made of NI—Cu or an insulator to transfer heat of the shielding plates to the charging battery cell, the insulator being able to emit heat and decrease thermal conductivity; and a shielding member surrounding a wireless power receiver circuit of the battery pack including a battery pack controller and a charging circuit block and including Al, Cu, or Ni Alloy metals to shield the magnetic field for the wireless power receiver circuit, wherein the magnetic plate includes an upper magnetic plate formed between the shielding plates and the charge receiver module; and a lower magnetic plate disposed in a lower portion of the charge receiver module.

7. The wireless charger system according to any one of claims 1 to 5, wherein the battery pack includes a magnetic plate that is a primary shielding member and a shield mesh member that is a secondary shielding member, both of the shielding members being formed between a battery cell case of the battery cell and the secondary core block, and the magnetic plate and the shield mesh member contain ferrites, Mn—Zn (50 parts by weight:50 parts by weight), Ni—Fe (80 parts by weight:20 parts by weight), or fine metals (Fe—Si—Cu—Nb) and the shield mesh member is formed in a mesh shape.

8. A method for controlling a wireless charger system for battery pack solution, comprising a wireless charger apparatus for receiving a power source from the outside to transmit a power signal via a charging power transmitter block in a wireless mode; and a battery pack for receiving a power signal from the wireless charger apparatus in a wireless mode to charge power in a battery cell and supplying a power source to a portable terminal block, the method comprising:

waiting for charging of an externally supplied power source by checking a state of the wireless charger apparatus prior to performing a wireless charging through the charging power transmitter block of the wireless charger apparatus;

transmitting a call signal for native ID of the battery pack to sense the battery pack through the charging power transmitter block of the wireless charger apparatus;

transmitting information on a native ID value and a state of the battery pack via the secondary core block of the battery pack by receiving a call signal of the native ID transmitted from the wireless charger apparatus in the battery pack, the native ID value being stored in a native ID transmission block of the battery pack;

determining the native ID value of the battery pack transmitted from the battery pack and the state of the battery pack;

charging a power in the battery pack by receiving a power via the charging power transmitter block of the wireless charger apparatus when the battery pack is ready to be charged;

sensing a completely charged signal in the wireless charger apparatus when the completely charged signal is transmitted from the battery pack in the step of charging the battery pack; and waiting for reception of the information on the charging level and the battery pack state from the battery pack by suspending a charging operation in the central controller of the wireless charger apparatus when the information on the completely charged signal is received from the battery pack.

* * * * *